(12) United States Patent
Parvis et al.

(10) Patent No.: US 11,571,768 B2
(45) Date of Patent: Feb. 7, 2023

(54) MANUFACTURE OF COOLING HOLES FOR CERAMIC MATRIX COMPOSITE COMPONENTS

(71) Applicant: General Electric Company, Schenectady, NY (US)

(72) Inventors: Alan Joseph Parvis, Loveland, OH (US); Timothy Francis Andrews, Sharonville, OH (US); Mark Samuel Bailey, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 550 days.

(21) Appl. No.: 15/678,510

(22) Filed: Aug. 16, 2017

(65) Prior Publication Data

US 2019/0054572 A1 Feb. 21, 2019

(51) Int. Cl.
*B23K 26/382* (2014.01)
*B23K 26/08* (2014.01)
(Continued)

(52) U.S. Cl.
CPC ........ *B23K 26/382* (2015.10); *B23K 26/0823* (2013.01); *B23K 26/361* (2015.10);
(Continued)

(58) Field of Classification Search
None
See application file for complete search history.

(56) References Cited

U.S. PATENT DOCUMENTS

| 5,043,553 A | 8/1991 | Corfe et al. |
| 5,149,937 A * | 9/1992 | Babel ................. B23K 26/0823 219/121.68 |

(Continued)

FOREIGN PATENT DOCUMENTS

| CN | 101100020 A | 1/2008 |
| CN | 103056519 A | 4/2013 |

(Continued)

OTHER PUBLICATIONS

European Search Report Corresponding to EP Application 181881459 dated Feb. 6, 2019.

(Continued)

*Primary Examiner* — Mohammad M Ameen
(74) *Attorney, Agent, or Firm* — Dority & Manning, P.A.

(57) ABSTRACT

Systems and methods for machining openings of a component are provided. In one exemplary aspect, a laser system includes features for machining an opening into a component, such as a cooling hole for a CMC component of a gas turbine engine. The component can be oriented in a first position and lasered while oriented in the first position to form a portion of the opening. The component is then oriented to a second position and lasered while oriented in the second position to form another portion of the opening. The component is alternated between the first and second positions until the predetermined geometry of the opening is formed. The component is oriented in the first and second positions such that the laser beam can machine the component without clipping areas that are not desired to be machined.

19 Claims, 19 Drawing Sheets

(51) Int. Cl.
*B23K 26/361* (2014.01)
*B23K 37/04* (2006.01)
*B23K 101/00* (2006.01)
*B23K 103/00* (2006.01)

(52) U.S. Cl.
CPC .... *B23K 37/0443* (2013.01); *B23K 2101/001* (2018.08); *B23K 2103/52* (2018.08)

(56) References Cited

U.S. PATENT DOCUMENTS

| | | |
|---|---|---|
| 5,225,650 A | 7/1993 | Babel et al. |
| 6,630,645 B2 | 10/2003 | Richter et al. |
| 6,670,026 B2 | 12/2003 | Steibel et al. |
| 6,720,567 B2 | 4/2004 | Fordahl et al. |
| 8,057,181 B1 | 11/2011 | Liang |
| 8,153,923 B2 | 4/2012 | Beck et al. |
| 8,245,519 B1 | 8/2012 | Liang |
| 8,618,439 B2 | 12/2013 | Beck et al. |
| 2004/0164060 A1 | 8/2004 | Maeda et al. |
| 2009/0321395 A1 | 12/2009 | Hu et al. |
| 2012/0148769 A1* | 6/2012 | Bunker .................. B23P 15/04 428/34.1 |
| 2014/0299785 A1 | 10/2014 | Krause et al. |
| 2017/0159461 A1 | 6/2017 | Schoenhoff et al. |

FOREIGN PATENT DOCUMENTS

| | | |
|---|---|---|
| CN | 103990910 A | 8/2014 |
| DE | 102011056346 A1 | 6/2012 |
| EP | 0407969 A1 | 1/1991 |
| EP | 0437676 A1 | 7/1991 |
| JP | H03114688 A | 5/1991 |
| JP | H03180294 A | 8/1991 |
| JP | 2000/071086 A | 3/2000 |
| JP | 2002/160084 A | 6/2002 |
| JP | 2004/243404 A | 9/2004 |
| JP | 2007021548 A | 2/2007 |
| JP | 2012/127000 A | 7/2012 |
| JP | 2014/202756 A | 10/2014 |
| KR | 2014/0028196 A | 3/2014 |

OTHER PUBLICATIONS

Chinese Search Report and Office Action Corresponding to Application No. 201810926995 dated Jun. 3, 2020.
Machine Translated Japanese Search Report Corresponding Application No. 2018149251 dated Dec. 16, 2019.
Machine Translated Japanese Office Action Corresponding Application No. 2018149251 dated Dec. 20, 2019.

* cited by examiner

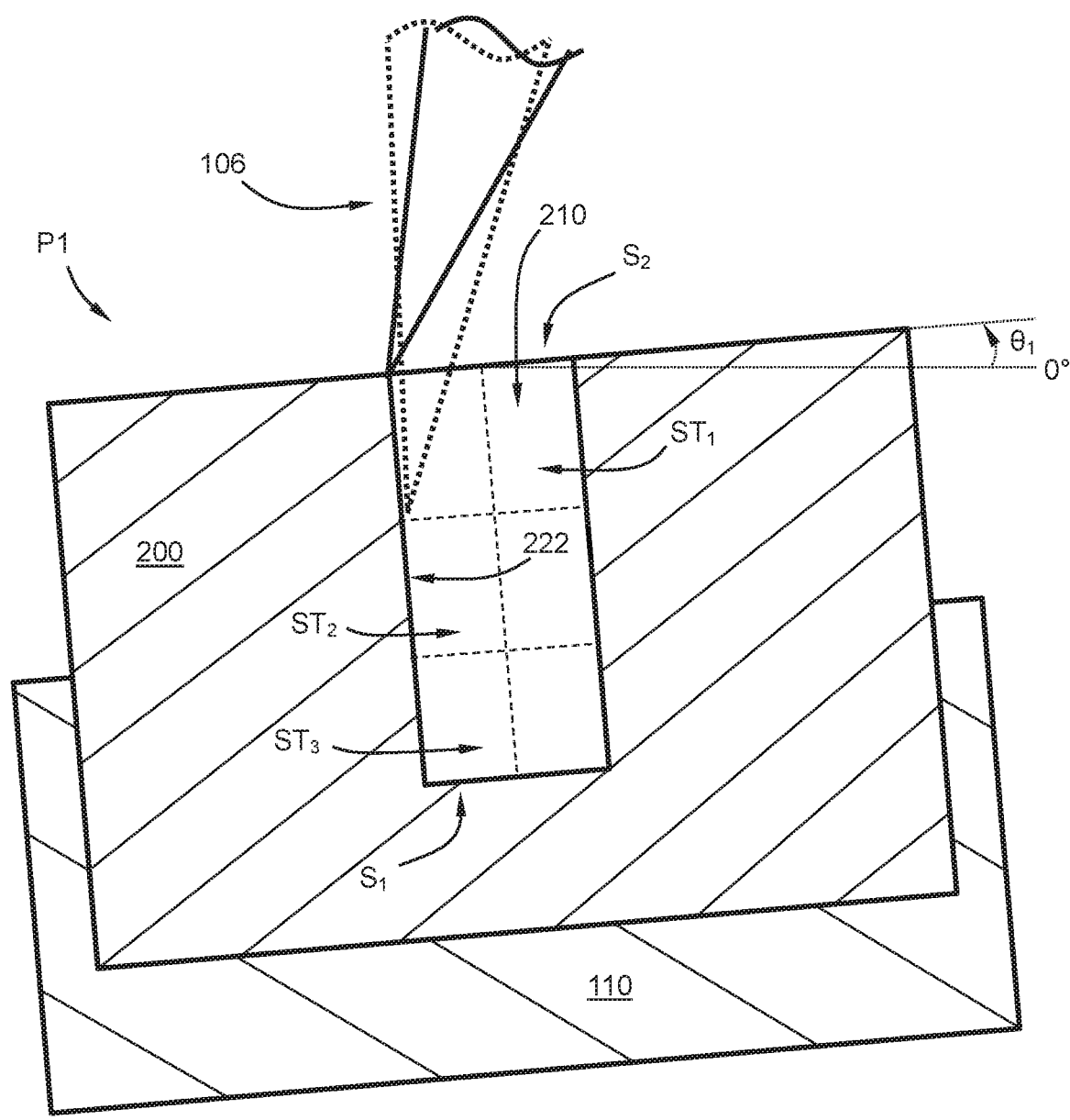
FIG. 10
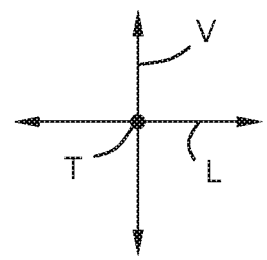

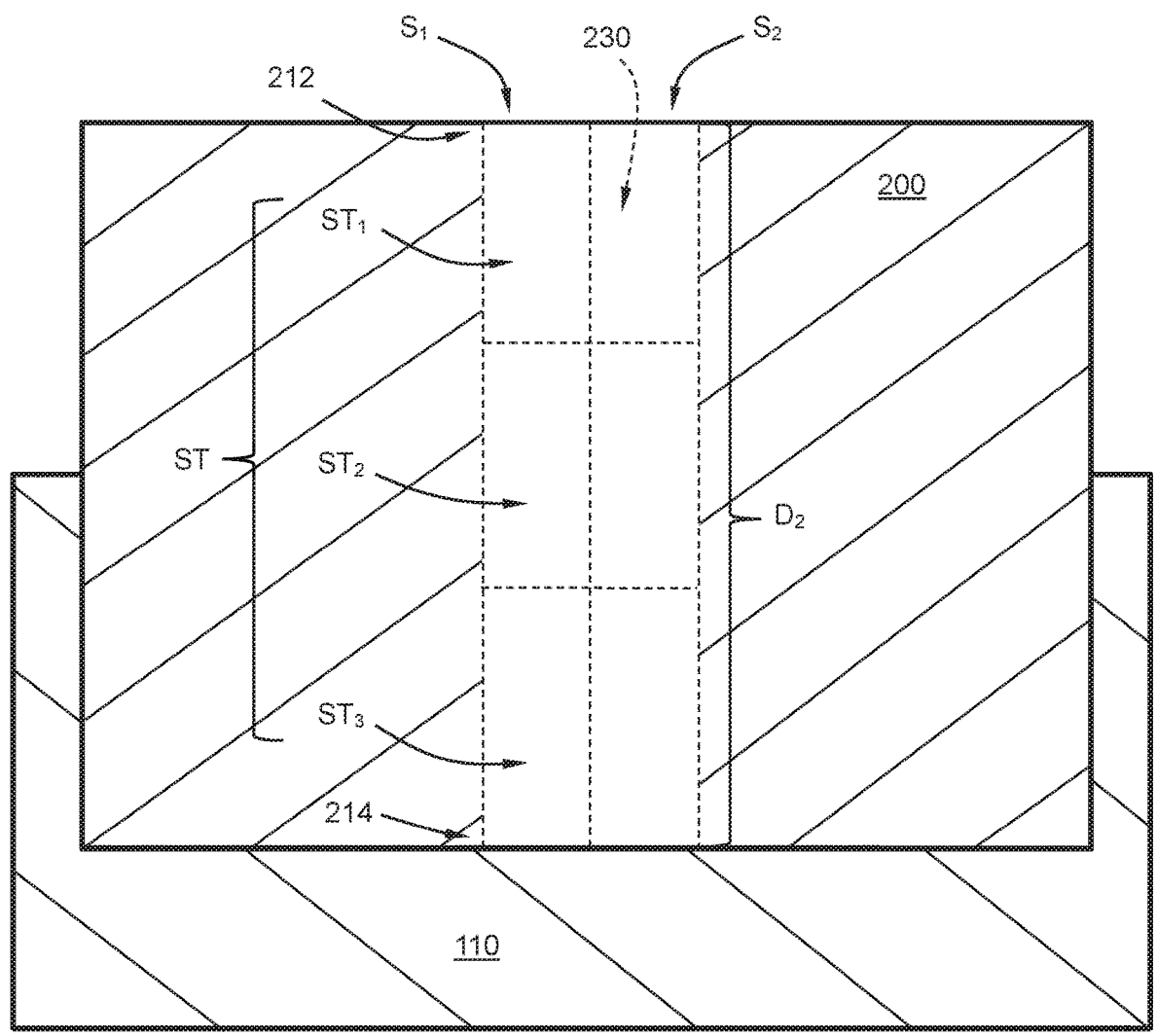
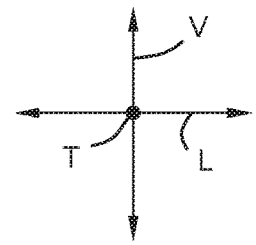
FIG.15

MANUFACTURE OF COOLING HOLES FOR CERAMIC MATRIX COMPOSITE COMPONENTS

FIELD

The present subject matter relates generally to laser machining systems and methods for forming openings in ceramic matrix composite components of gas turbine engines.

BACKGROUND

In general, turbine performance and efficiency can be improved by increased combustion gas temperatures. Non-traditional high temperature materials, such as ceramic matrix composite (CMC) materials, are more commonly being used for various components within gas turbine engines. For example, because CMC materials can withstand relatively extreme temperatures, there is particular interest in replacing components within the flow path of the combustion gases with CMC materials. However, even though CMC components may withstand more extreme temperatures than typical components, CMC components still may require cooling features or reduced exposure to the combustion gases to decrease a likelihood of negative impacts of increased combustion gas temperatures, e.g., material failures or the like. One such cooling feature includes cooling holes configured to receive a cooling fluid. By flowing cooling fluid through the cooling holes, the thermal stress on such CMC components can be reduced. In this way, the operational service lives of such CMC components can be optimized.

Laser systems have conventionally been used to machine cooling holes. However, conventional laser machining methods have led to less than satisfactory cooling hole geometries. For example, conventional laser methods for forming cooling holes in CMC components have caused laser beam clipping on the sides and edges of the interior walls defining such cooling holes. That is, in some instances during lasering, conically-shaped laser beams have clipped areas that are not desired to be machined. When such areas are clipped, the result is typically a tapered cooling hole. Tapered cooling holes can result in poor fluid film effectiveness through the holes, and consequently, heat transfer exchange between the cooling fluid and the CMC component is less than optimal. Moreover, conventional laser machining techniques are limited to relatively shallow penetration depths as laser beam clipping and the angle of inclination of the taper of the hole generally increases with the depth of the hole.

Therefore, improved laser machining systems and methods for forming openings in CMC components would be desirable. More particularly, laser manufacturing systems and methods for forming openings in CMC components would be beneficial.

BRIEF DESCRIPTION

Aspects and advantages of the invention will be set forth in part in the following description, or may be obvious from the description, or may be learned through practice of the invention.

In one exemplary embodiment of the present disclosure, a method for laser machining one or more walls of an opening of a component using a conically-shaped laser beam is provided. The one or more walls define a first wall portion and a second wall portion. The method includes orienting the component in a first position. The method also includes lasering at least a portion of the first wall portion while the component is oriented in the first position. Further, the method includes orienting the component in a second position. The method also includes lasering at least a portion of the second wall portion while the component is oriented in the second position.

In another exemplary embodiment of the present disclosure, a laser system for machining an opening into a component is provided. The laser system defines a vertical direction, a lateral direction, and a transverse direction each perpendicular to one another. The component defines a first section and a second section. The laser system includes a laser source configured to machine the opening with a conically-shaped laser beam. The laser system also includes an adjustable lens configured to focus the laser beam. The laser system further includes an actuation assembly for orienting the component. The laser system also includes a controller communicatively coupled with the laser source, the adjustable lens, and the actuation assembly, the controller is configured to: control the actuating assembly to orient the component in a first position, wherein when the component is oriented in the first position, the component has a first pitch angle indicative of a pitch of the component about at least one of the lateral and transverse directions with respect to a reference plane defined by the lateral and transverse directions; control the laser source and the adjustable lens to laser the first section of the component while the component is oriented in the first position; control the actuating assembly to orient the component in a second position, wherein when the component is oriented in the second position, the component has a second pitch angle indicative of a pitch of the component about at least one of the lateral and transverse directions with respect to a reference plane defined by the lateral and transverse directions; and control the laser source and the adjustable lens to laser the second section of the component while the component is oriented in the second position.

In a further exemplary embodiment of the present disclosure, a method for laser machining an opening into a component using a conically-shaped laser beam is provided. The opening defines a first section and a second section opposite the first section. The method includes orienting the component in a first position, wherein when the component is oriented in the first position, the component has a first pitch angle indicative of a pitch of the component about at least one of the lateral and transverse directions with respect to a reference plane defined by the lateral and transverse directions. The method also includes lasering at least a portion of the first section of the opening while the component is oriented in the first position. Moreover, the method further includes orienting the component in a second position, wherein when the component is oriented in the second position, the component has a second pitch angle indicative of a pitch of the component about at least one of the lateral and transverse directions with respect to the reference plane defined by the lateral and transverse directions. The method also includes lasering at least a portion of the second section of the opening while the component is oriented in the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 10 provides a schematic view of the component of FIGS. 8 and 9 oriented in a first position and being machined by a laser beam along the first wall portion at the first section and first stage of an opening of the component;

FIG. 15 provides a cross-sectional view of the component taken along line 15-15 of FIG. 14 according to an exemplary embodiment of the present subject matter;

DETAILED DESCRIPTION OF THE INVENTION

Figure 1:
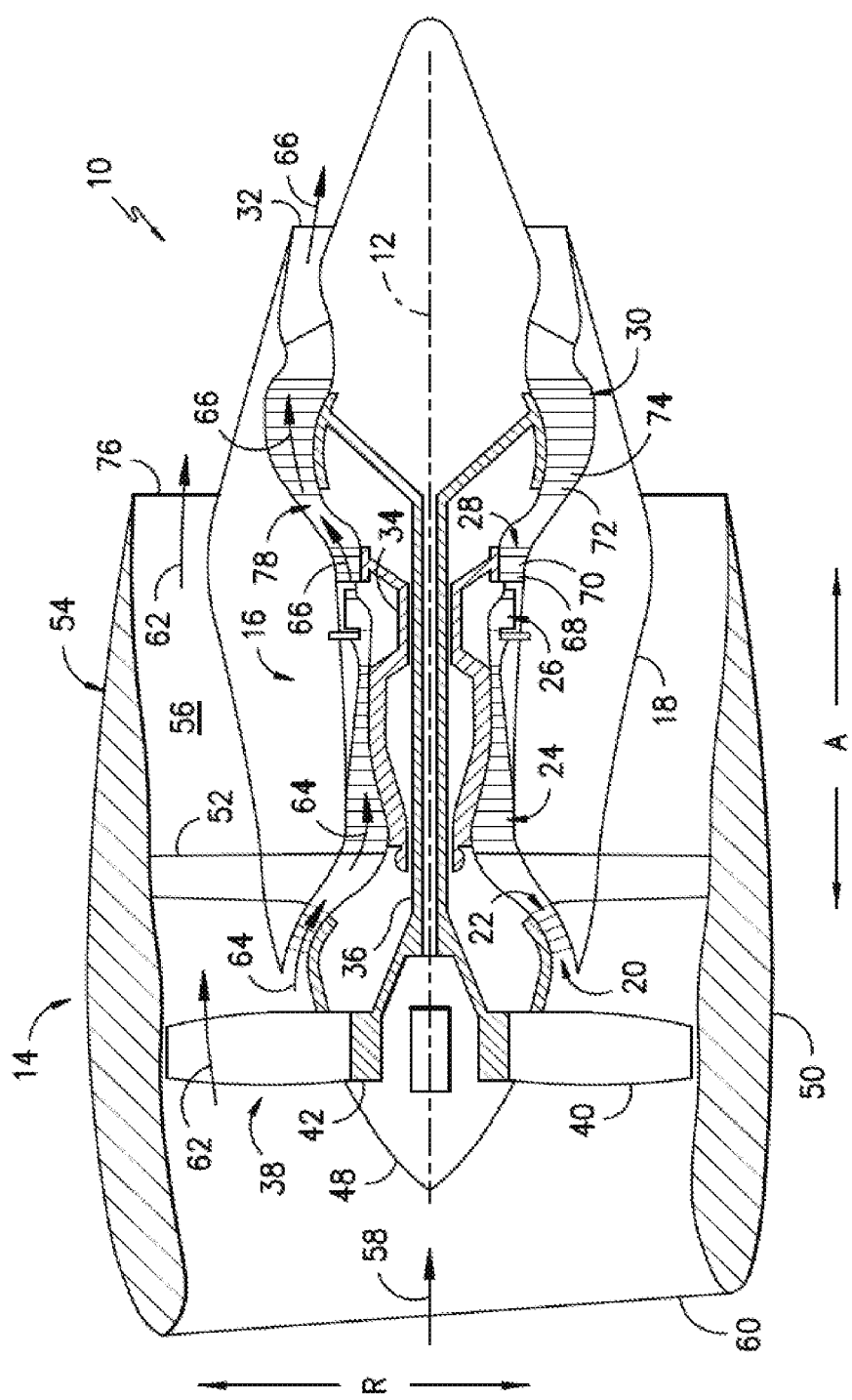
FIG. 1 provides a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. As used herein, "substantially" means within twenty percent (20%) of the noted value unless specifically stated otherwise. As used herein, "about" means within about ten percent (10%) of the noted value unless specifically stated otherwise.

The present subject matter is directed to laser systems and methods therefore for machining openings of a component. In one exemplary aspect, a laser system includes features for machining an opening into a component, such as a cooling hole for a CMC component of a gas turbine engine. To form the opening, the component can be oriented in a first position and lasered while oriented in the first position to form a portion of the opening. The component is then oriented to a second position and lasered while oriented in the second position to form another portion of the opening. The component is alternated between the first and second positions until the predetermined geometry of the opening is formed. The component is oriented in the first and second positions such that the laser beam can machine the component without clipping areas of the component that are not desired to be machined.

By orienting the component in one or more positions, the angle of attack of the laser beam can be adjusted. By adjusting the angle of attack of the laser beam, the component can be optimally positioned for lasering. That is, the component can be oriented such that the conically-shaped laser beam does not clip areas in and around the opening that are not desired to be machined. In this way, the desired design intent or predetermined geometry of the opening can be achieved. Orienting the component can also reduce or eliminate tapering of the openings. This can effectively improve the film effectiveness of the opening where the opening is a cooling hole. In addition, by orienting the component in various positions, such as e.g., by pitching the component with respect to a reference plane, the laser beam can penetrate further into the opening without clipping the edges of the opening. The angle of attack of the laser beam can be adjusted as the laser beam penetrates further into the depth of the opening. Accordingly, openings with greater depths can be achieved.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. Fan blades 40 and disk 42 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

CMC materials may be used for various components of the engine, for example, turbine nozzles and/or airfoils in the compressor, and/or fan regions. Turbine nozzles, comprising stator vanes extending between inner and outer bands, direct the hot combustion gas in a manner to maximize extraction at the adjacent downstream turbine blades. As such, CMC materials are desirable for use in forming turbine nozzles exposed to the high temperatures of the hot combustion gases. Of course, other components of turbine engine 10 also may be formed from CMC materials.

Figure 2:
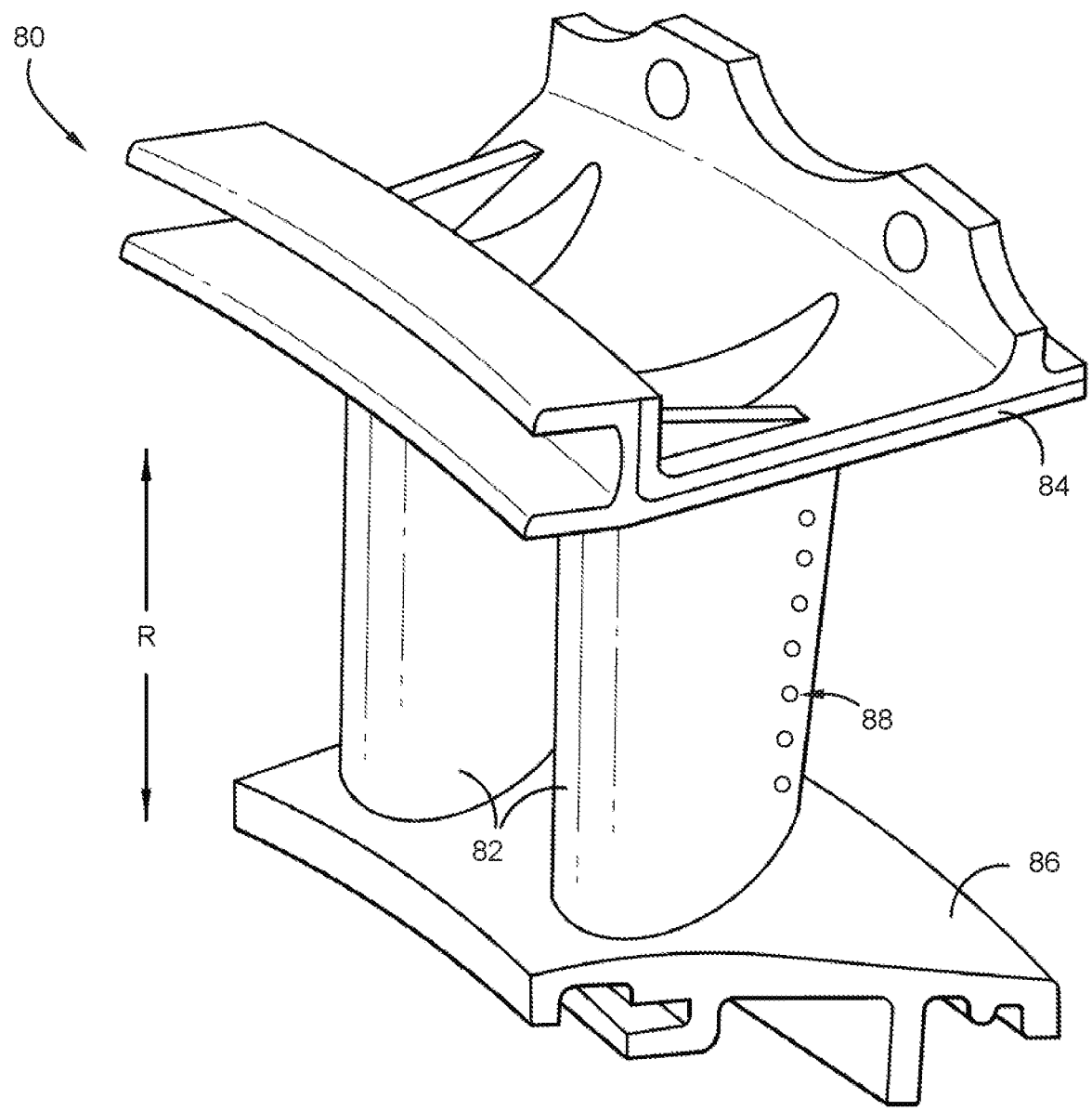
FIG. 2 provides a perspective view of a turbine nozzle segment according to an exemplary embodiment of the present subject matter.

FIG. 2 provides a perspective view of a turbine nozzle segment 80 according to an exemplary embodiment of the present subject matter. For this embodiment, the turbine nozzle segment 80 is made of a CMC material. In alternative embodiments, the turbine nozzle segment 80 can be made of any other suitable material, such as e.g., a high temperature alloy. The turbine nozzle segment 80 is one of a number of nozzle segments that when connected together form an annular-shaped nozzle assembly of a gas turbine engine, such as e.g., the turbofan engine 10 of FIG. 1. The nozzle segment 80 is made up of vanes 82, such as e.g., stator vanes 68 of the turbofan engine 10 of FIG. 1. Each of the vanes 82 define an airfoil and extend between an outer and inner band 84, 86. Notably, the airfoil portions of the vanes 82 define a plurality of cooling holes 88. Cooling holes 88 provide film cooling to improve the thermal capability of the vanes 82. As will be explained more fully below, the cooling holes, and more broadly openings, can be machined or formed into the airfoils of vanes 82 in a manner described herein.

Figure 3:
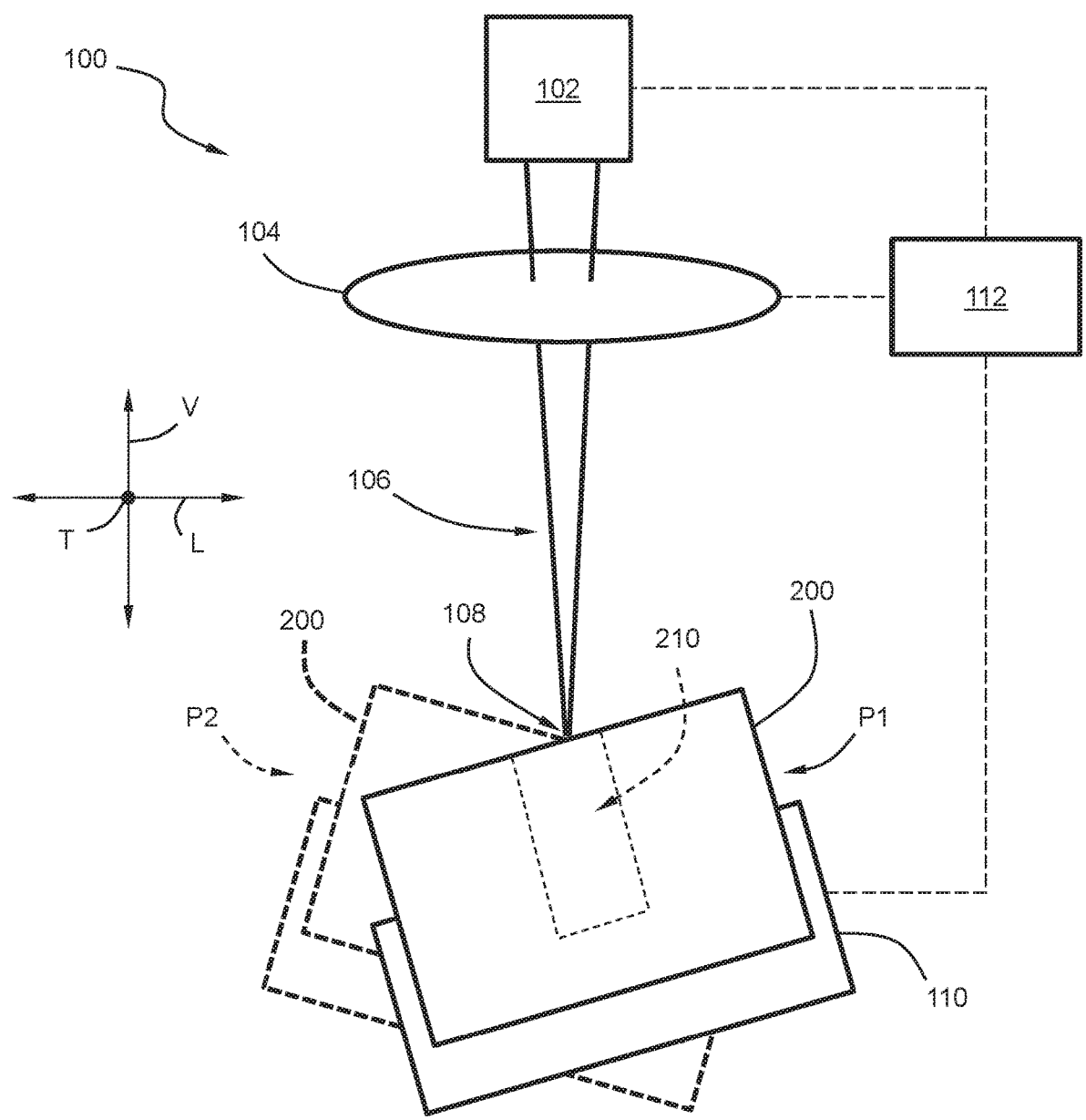
FIG. 3 provides a schematic view of a laser system according to an exemplary embodiment of the present subject matter.

FIG. 3 provides a schematic view of an exemplary laser system 100 according to an exemplary embodiment of the present subject matter. More particularly, for this embodiment, the laser system 100 is operatively configured to form an opening 210 in a component 200, such as e.g., the CMC component of FIG. 2, combustor liners, turbine rotor blades, turbine stator vanes, compressor rotor blades, compressor stator vanes, etc. As used herein, the term "opening" is used to indicate a geometry formed or machined into a component or workpiece. For example, an opening can be a cooling hole of a CMC component of a gas turbine engine, such as e.g., a cooling hole for a turbine component or a combustor liner. As yet other examples, an opening can be a through hole, a recess, an indentation, a cavity, a channel, a slot, a rectangular slot, a chamber, a blind hole, an ash, a fan, a rounded rectangle, or the like formed or machined into a component or workpiece. In some embodiments, the distance between opposing walls or opposing portions of a wall range from about 0.015 inches (≈0.04 cm) to 0.060 inches (≈0.15 cm) for such openings. Moreover, in some embodiments, the depths of such openings can range from about 0.050 inches (≈0.13 cm) to 0.300 inches (≈0.76 cm). Moreover, in some embodiments, the length over diameter ratio (L/D) can range from about a 1:1 to about a 10:1 for such openings.

As shown in FIG. 3, the laser system 100 defines a vertical direction V, a lateral direction L, and a transverse direction T. Each of the vertical direction V, lateral direction L, and transverse direction T are mutually perpendicular to one another and form an orthogonal direction system. For this embodiment, the laser system 100 includes a laser source 102 and a mirror or adjustable lens 104 for directing or focusing a laser beam 106 emitted from the laser source 102. As depicted in FIG. 3, the laser beam 106 is conically shaped. The adjustable lens 104 is adjustable such that the focal or focus point 108 of the laser beam 106 (i.e., the apex or vertex of the cone shaped laser beam 106) can be moved or scanned about such that desirable openings and geometries in the workpiece can be machined.

The laser system 100 also includes an actuating assembly 110. The actuating assembly 110 is operatively configured to translate, rotate, pivot, actuate, adjust, or otherwise move the component 200 between various positions. For example, as shown in FIG. 3, the actuating assembly 110 can orient the component 200 in a first position P1 (shown in the solid lines in FIG. 3) and can orient the component 200 in a second position P2 (shown in the dotted lines in FIG. 3). In this way, as will be described in detail herein, the angle of attack of the laser beam 106 can be modified or adjusted such that the opening 210 can be formed into the component 200 without the laser beam 106 clipping areas of the component 200 that are not desired to be machined. The actuating assembly 110 can be any suitable type of actuating assembly 110 capable of orienting the component 200 in a manner described herein. For instance, the actuating assembly 110 can be a robotic arm or an adjustable fixture, for example.

As further shown in FIG. 3, the laser system 100 further includes a controller 112. The controller 112 is communicatively coupled with the laser source 102, the adjustable lens 104, and the actuating assembly 110. The controller 112 can be communicatively coupled with the laser source 102, adjustable lens 104, and actuating assembly 110 via one or more signal lines or shared communication busses, or additionally or alternatively, the controller 112 can be communicatively coupled with laser source 102, adjustable lens 104, and actuating assembly 110 via one or more wireless connections.

Operation of the laser system 100 is controlled by the controller 112. In some exemplary embodiments, the controller 112 can include a control panel that can represent a general purpose I/O ("GPIO") device or functional block. In some exemplary embodiments, the control panel can include input components, such as one or more of a variety of electrical, mechanical or electro-mechanical input devices including rotary dials, push buttons, touch pads, and touch screens. The control panel provides selections for user manipulation of the operation of the laser system 100. In response to user manipulation of the control panel, the controller 112 operates various components of the laser system 100.

The controller 112 includes one or more memory devices and one or more processing devices, such as e.g., microprocessors, CPUs or the like, such as general or special purpose microprocessors operable to execute programming instructions or micro-control code associated with operation of the laser system 100. The memory can represent random access memory such as DRAM, or read only memory such as ROM or FLASH. The processor executes programming instructions stored in the memory. The memory can be a separate component from the processor or can be included onboard within the processor. Alternatively, the controller 112 can be constructed without using a microprocessor, e.g., using a combination of discrete analog and/or digital logic circuitry (such as switches, amplifiers, integrators, comparators, flipflops, AND gates, and the like) to perform control functionality instead of relying upon software.

Figure 4:
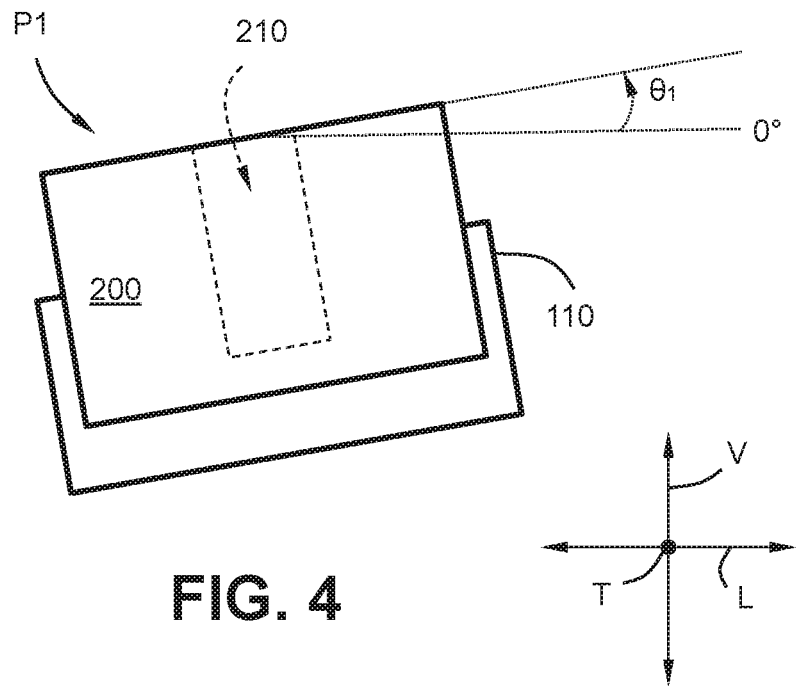
FIG. 4 provides a schematic view of a component and actuating assembly of the laser system of FIG. 3 depicting the component in a first position according to an exemplary embodiment of the present subject matter.
Figure 5:
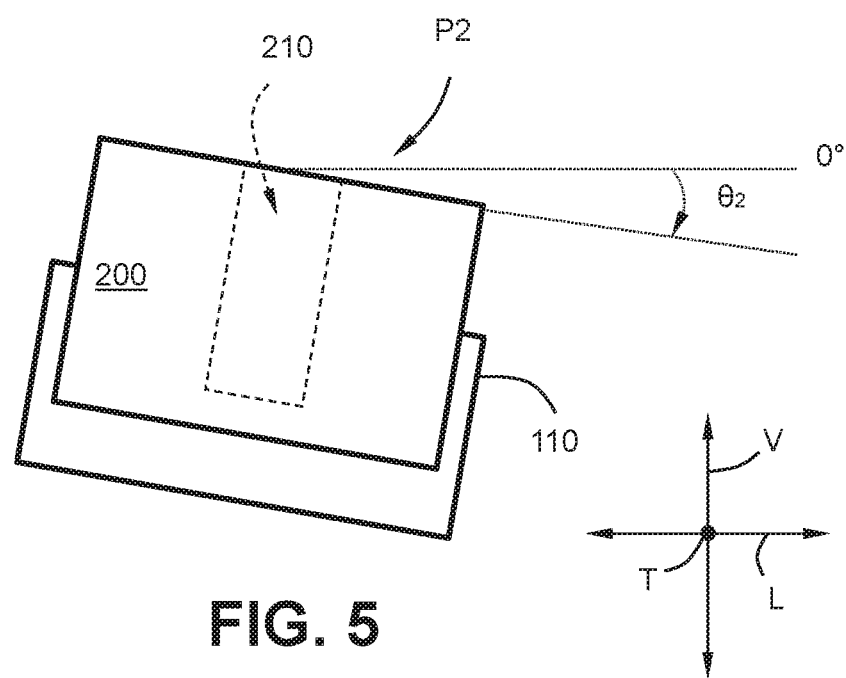
FIG. 5 provides a schematic view of the component and actuating assembly of the laser system of FIG. 3 depicting the component in a second position according to an exemplary embodiment of the present subject matter.
Figure 6:
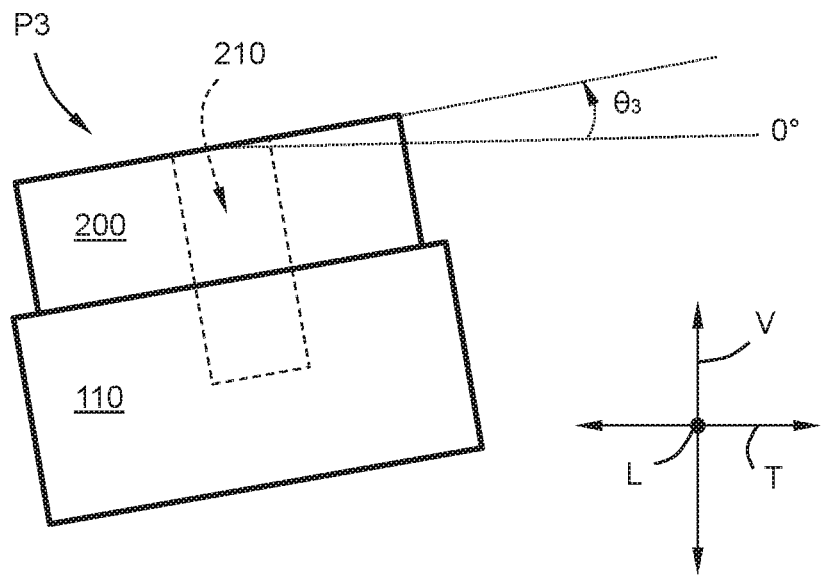
FIG. 6 provides a schematic view of the component and actuating assembly of the laser system of FIG. 3 depicting the component in a third position according to an exemplary embodiment of the present subject matter.
Figure 7:
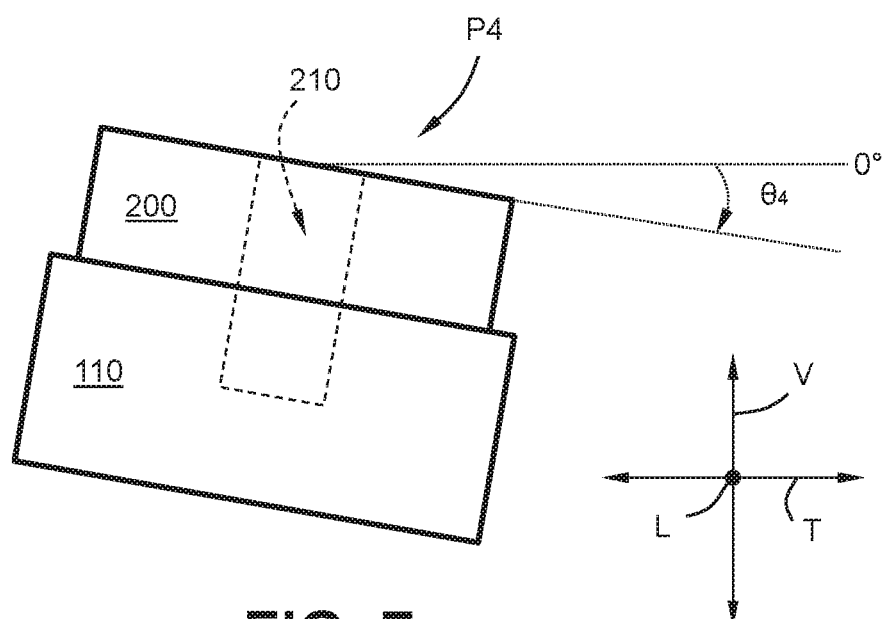
FIG. 7 provides a schematic view of the component and actuating assembly of the laser system of FIG. 3 depicting the component in a fourth position according to an exemplary embodiment of the present subject matter.

With reference now to FIGS. 4 through 7, actuation of the component 200 will now be further described. FIG. 4 provides a schematic view of the component 200 and actuating assembly 110 of the laser system 100 of FIG. 3 depicting the component 200 in the first position P1; FIG. 5 provides a schematic view of the component 200 and actuating assembly 110 of the laser system 100 of FIG. 3 depicting the component 200 in the second position P2; FIG. 6 provides a schematic view of the component 200 and actuating assembly 110 of the laser system 100 of FIG. 3 depicting the component 200 in a third position P3; and FIG. 7 provides a schematic view of the component 200 and actuating assembly 110 of the laser to an exemplary embodiment of the present subject matter.

As shown in FIG. 4, the actuation assembly 110 has oriented the component 200 in the first position P1. As shown, when the component 200 is oriented in the first position P1, the component 200 has a first pitch angle $\theta_1$ with respect to a plane defined by the lateral and transverse directions L, T. As used herein, the first pitch angle $\theta_1$ designates an upward pitch about the transverse direction T of the component 200 with respect to a zero degree (0°) reference line. For this embodiment, for example, starting from zero degrees (0°) and moving in a counterclockwise direction about the transverse direction T from the perspective in FIG. 4, the component 200 is pitched upward by ten degrees (10°). In some exemplary embodiments, the component 200 is pitched upward by no more than five degrees (5°). In other exemplary embodiments, the component 200 can be pitched upward about the transverse direction T by any suitable amount of degrees.

As shown in FIG. 5, the actuation assembly 110 has oriented the component 200 in the second position P2. As depicted, when the component 200 is oriented in the second position P2, the component 200 has a second pitch angle $\theta_2$ with respect to a plane defined by the lateral and transverse directions L, T. As used herein, the second pitch angle $\theta_2$ designates a downward pitch about the transverse direction T of the component 200 with respect to a zero degree (0°) reference line. For this embodiment, for example, starting from zero degrees (0°) and moving in a clockwise direction about the transverse direction T from the perspective in FIG. 5, the component 200 is pitched downward by ten degrees (10°). The component 200 can be pitched downward about the transverse direction T by any suitable amount of degrees.

In some embodiments, the second pitch angle $\theta_2$ is an angle opposite the first pitch angle $\theta_1$. For instance, in this example, as the first pitch angle $\theta_1$ is an upward pitch of ten degrees (10°), the second pitch angle $\theta_2$ is a downward pitch of ten degrees (10°) with respect to the plane defined by the lateral and transverse directions L, T. In other embodiments, the second pitch angle $\theta_2$ need not be opposite the first pitch angle $\theta_1$.

As shown in FIG. 6, the actuation assembly 110 has oriented the component 200 in the third position P3. As shown, when the component 200 is oriented in the third position P3, the component 200 has a third pitch angle $\theta_3$ with respect to a plane defined by the lateral and transverse directions L, T. As used herein, the third pitch angle $\theta_3$ designates an upward pitch about the lateral direction L of the component 200 with respect to a zero degree (0°) reference line. For this embodiment, for example, starting from zero degrees (0°) and moving in a counterclockwise direction about the lateral direction L from the perspective in FIG. 6, the component 200 is pitched upward by ten degrees (10°).

As shown in FIG. 7, the actuation assembly 110 has oriented the component 200 in the fourth position P4. As depicted, when the component 200 is oriented in the fourth position P4, the component 200 has a fourth pitch angle $\theta_4$ with respect to a plane defined by the lateral and transverse directions L, T. As used herein, the fourth pitch angle $\theta_4$ designates a downward pitch about the lateral direction L of the component 200 with respect to a zero degree (0°) reference line. For this embodiment, for example, starting from zero degrees (0°) and moving in a clockwise direction about the lateral direction L from the perspective in FIG. 7, the component 200 is pitched downward by ten degrees (10°). The component 200 can be pitched downward about the lateral direction L by any suitable amount of degrees.

In some embodiments, the fourth pitch angle $\theta_4$ is an angle opposite the third pitch angle $\theta_3$. For instance, in this example, as the third pitch angle $\theta_3$ is an upward pitch of ten degrees (10°), the fourth pitch angle $\theta_4$ is a downward pitch of ten degrees (10°) of the component 200 with respect to the plane defined by the lateral and transverse directions L, T. In other embodiments, the fourth pitch angle $\theta_4$ need not be opposite the third pitch angle $\theta_3$.

In some embodiments, in addition to rotating or pivoting the component 200, the actuation assembly 110 can also translate the component 200 along the plane defined by the lateral and transverse directions L, T. That is, the component 200 can be translated in the lateral direction L, the transverse direction T, or a combination of the lateral and transverse directions L, T. Additionally or alternatively, the actuation assembly 110 can translate the component 200 along the vertical direction V. By translating the component 200 along one or more of the lateral, transverse and vertical directions L, T, V, in some instances, the laser beam 106 (FIG. 3) can more easily laser the opening 210 without clipping one or more of the walls defining the opening 210.

In one exemplary aspect, a laser system operatively configured to machine the interior walls of an opening previously formed in a component is provided. For example, the laser system can be used to widen an opening via a boring process with the laser beam. As another example, the laser system can be used to ream, polish, or smooth the interior walls of a cooling hole of a component to improve the film effectiveness. An exemplary manner in which an opening can be machined by the laser system will now herein be described.

Figure 8:
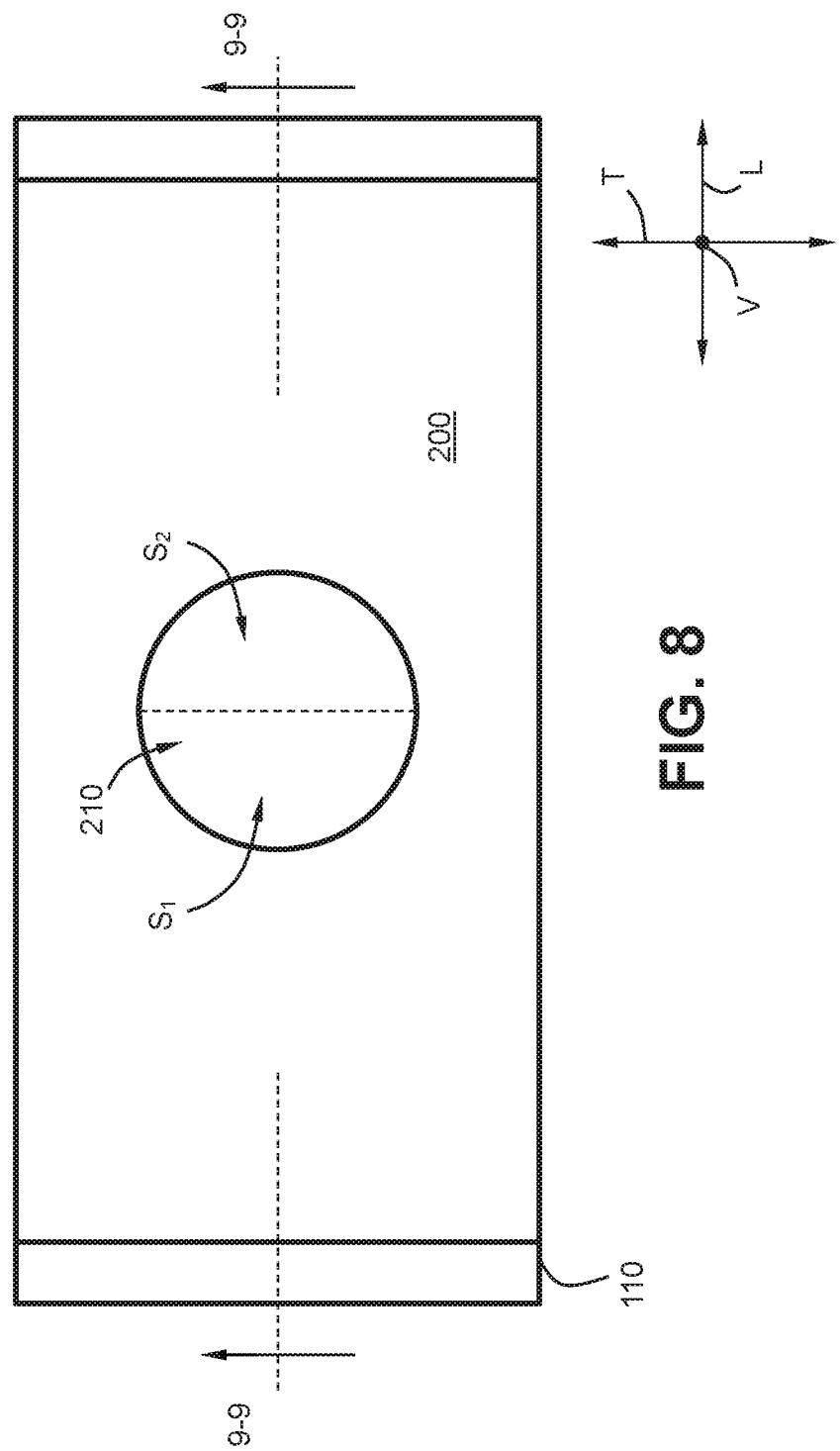
FIG. 8 provides a top view of the component and actuating assembly of FIG. 3 according to an exemplary embodiment of the present subject matter.
Figure 9:
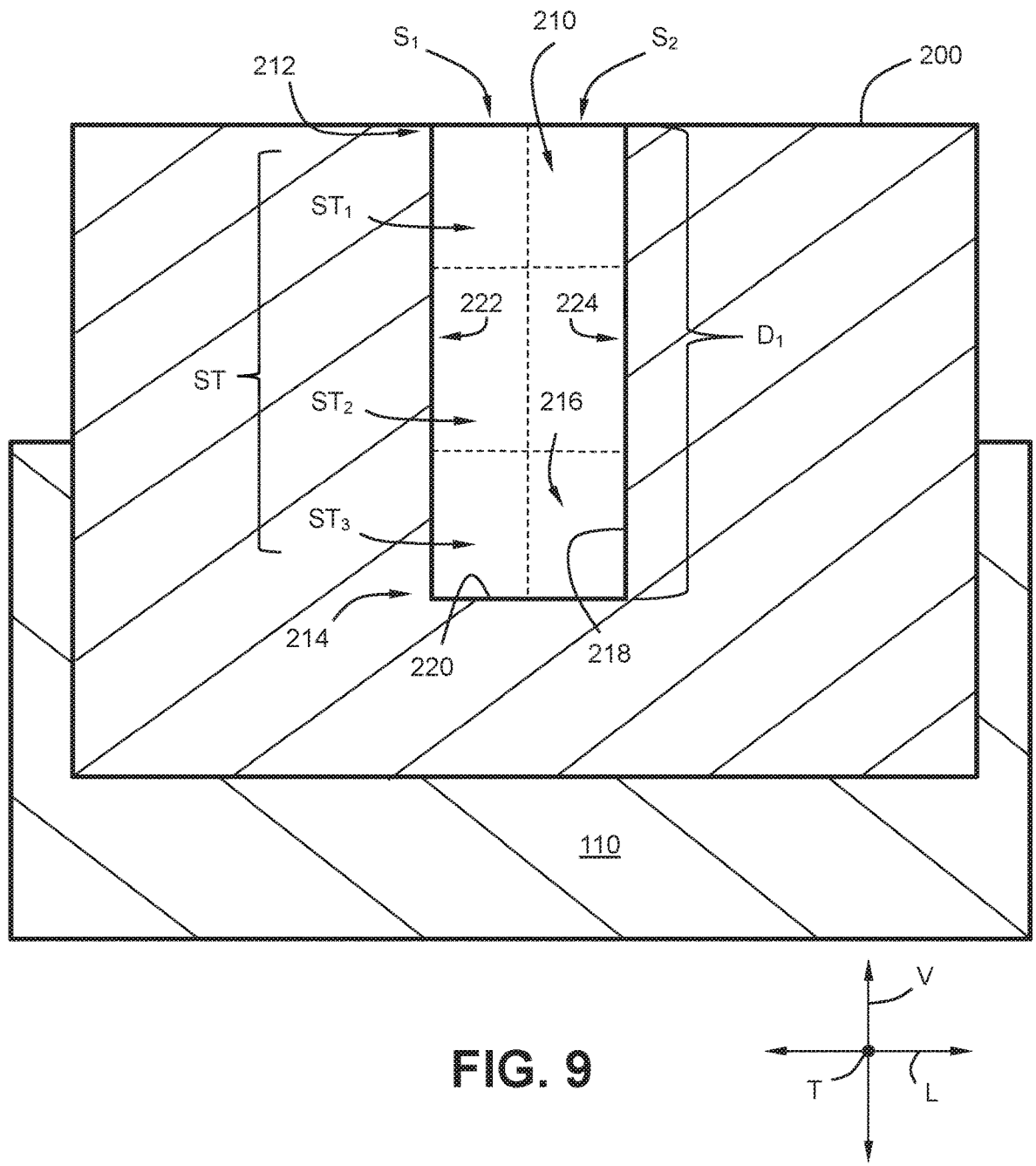
FIG. 9 provides a cross-sectional view of the component taken along line 9-9 of FIG. 8 according to an exemplary embodiment of the present subject matter.

FIGS. 8 and 9 provide an example component 200 having an opening 210 previously formed in the component 200. More particularly, FIG. 8 provides a top view of the component 200 and actuating assembly 110 of FIG. 3 and FIG. 9 provides a cross-sectional view of the component 200 and actuating assembly 110 taken along line 9-9 of FIG. 8 according to an exemplary embodiment of the present subject matter. For this embodiment, the component 200 is a CMC component shaped as a rectangular cuboid and the opening 210 is a blind hole already formed into the component 200 (i.e., a hole that does not extend all the way through the component).

As shown in FIGS. 8 and 9, the component 200 defines vertical direction V, lateral direction L, and transverse direction T. Each of the vertical direction V, lateral direction L, and transverse direction T are mutually perpendicular to one another and form an orthogonal direction system. Thus, the component 200 defines the same coordinate system as the laser system 100 (FIG. 3). The component 200 defines opening 210 extending between a first end 212 and a second end 214 along the vertical direction V, which in this embodiment are the top and bottom portions of the opening 210, respectively. More particularly, one or more walls 216 of the component 200 define the generally cylindrical opening 210. For this embodiment, the one or more walls 216 include a sidewall 218 extending circumferentially about the vertical direction V and a base wall 220 extending in a plane along the lateral and transverse directions L, T. The distance between the first end 212 and the second end 214 is denoted as the depth $D_1$ of the opening 210.

As shown particularly in FIGS. 8 and 9, the one or more walls 216 that define the opening 210 also define a first section $S_1$ and a second section $S_2$ opposite the first section $S_1$. As shown, the first section $S_1$ and the second section $S_2$ each extend along the depth $D_1$ of the opening 210 (FIG. 9). As further shown in FIG. 9, the opening 210 defines a plurality of stages ST along its depth $D_1$. Each of the stages ST define a portion of the depth $D_1$ as shown in FIG. 9. More particularly, the opening 210 defines a first stage $ST_1$ at or proximate the top end 212, a second stage $ST_2$ deeper in depth than the first stage $ST_1$, and a third stage $ST_3$ deeper in depth than the second stage $ST_2$. Although three stages (rows) are shown in this embodiment, it will be appreciated that the opening 210 can define any suitable number of stages, such as e.g., ten (10) stages, one hundred (100) stages, one thousand (1,000) stages, etc. Moreover, although two sections (columns) are shown in this embodiment, it will be appreciated that the opening 210 can define any suitable number of sections, such as e.g., four (4) sections, six (6) sections, eight (8) sections, etc.

With reference to FIG. 9, as shown, the one or more walls 216 defining the first section $S_1$ include a first wall portion 222 and the one or more walls 216 defining the second section $S_2$ include a second wall portion 224. In some embodiments, such as the illustrated embodiment of FIG. 9, the first wall portion 222 is parallel to the second wall portion 224 (i.e., each tangential point along the first wall portion 222 is parallel to the tangential point of the second wall portion 224 that is opposite it across the opening 210).

Figure 11:
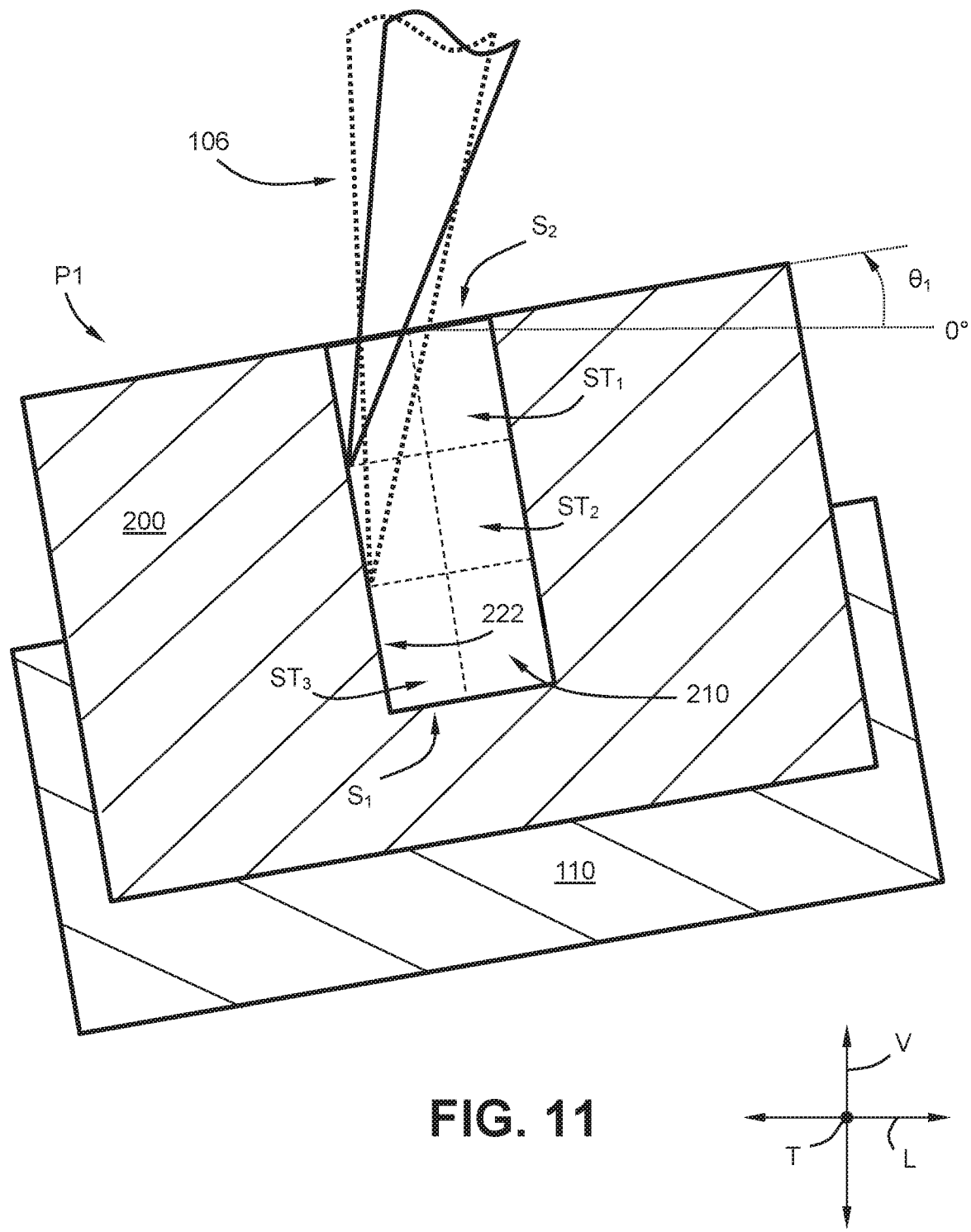
FIG. 11 provides another schematic view of the component of FIGS. 8 and 9 oriented in the first position and being machined by the laser beam along the first wall portion at the first section and second stage of the opening.
Figure 12:
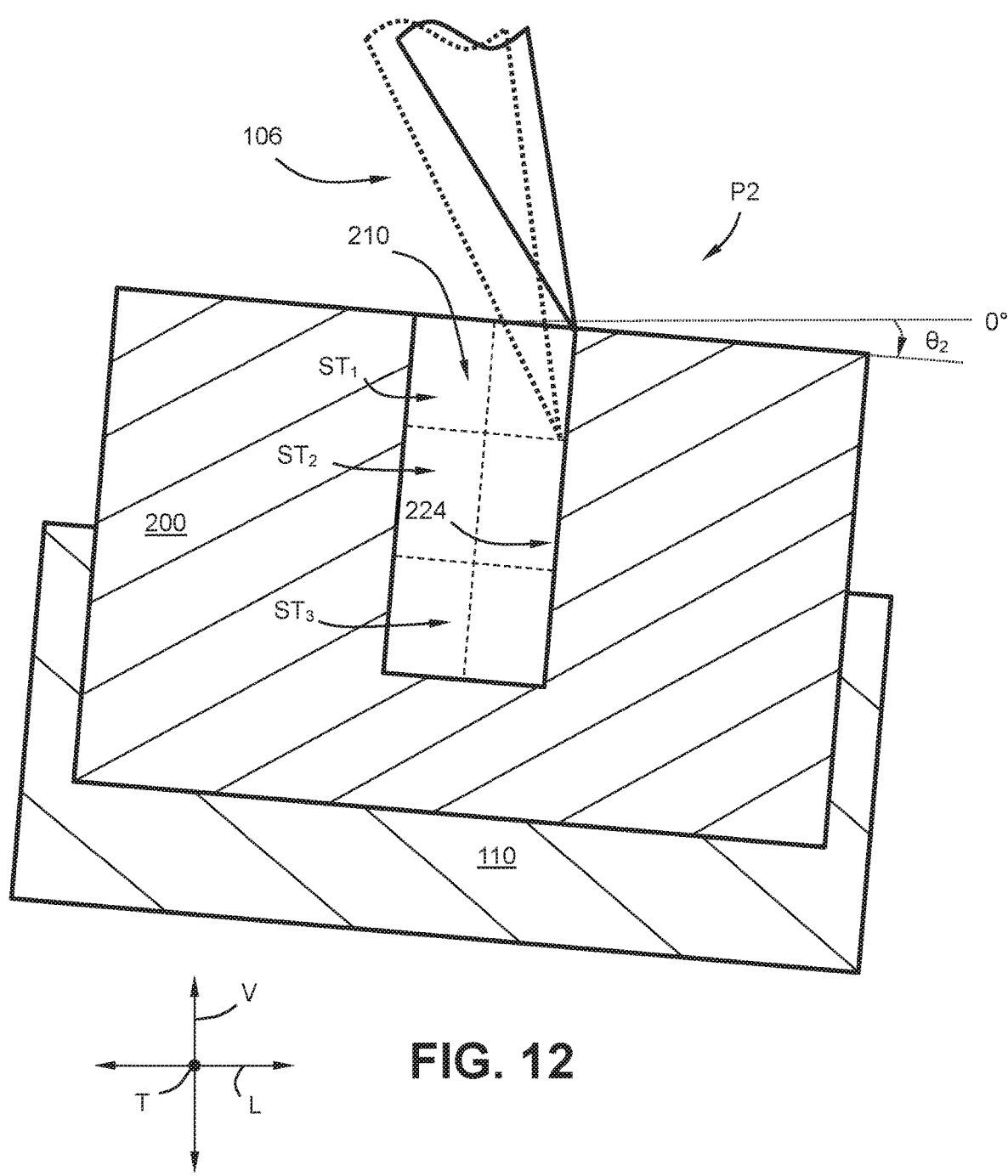
FIG. 12 provides a schematic view of the component of FIGS. 8 and 9 oriented in a second position and being machined by a laser beam along the second wall portion at the second section and first stage of the opening of the component.
Figure 13:
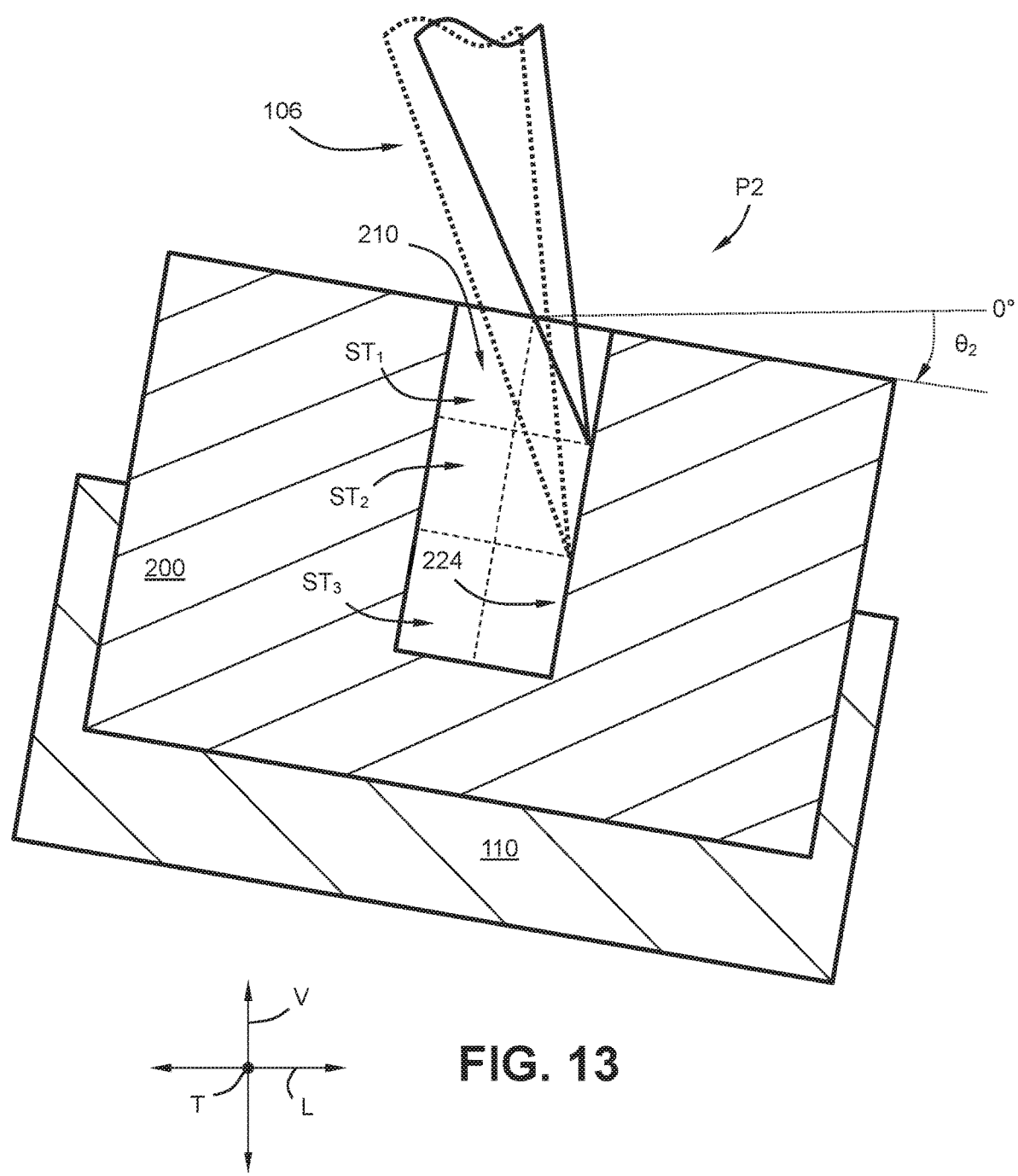
FIG. 13 provides another schematic view of the component of FIGS. 8 and 9 oriented in a second position and being machined by a laser beam along the second wall portion at the second section and second stage of the opening of the component.

With reference now to FIGS. 10 through 13, an exemplary process for machining the interior walls 216 of the opening 210 will be described. FIG. 10 provides a schematic view of the component 200 of FIGS. 8 and 9 oriented in a first position P1 and being machined by the conically-shaped laser beam 106 at the first section $S_1$ and first stage $ST_1$ of the opening 210; FIG. 11 provides another view of the component 200 thereof oriented in the first position P1 and being machined by the conically-shaped laser beam 106 at the first section $S_1$ and second stage $ST_2$ of the opening 210; FIG. 12 provides another view of the component 200 thereof oriented in the second position P2 and being machined by the conically-shaped laser beam 106 at the second section $S_2$ and first stage $ST_1$ of the opening 210; and FIG. 13 provides yet another view of the component 200 thereof oriented in the second position P2 and being machined by the conically-shaped laser beam 106 at the second section $S_2$ and second stage $ST_2$ of the opening 210.

As shown in FIG. 10, the laser beam 106 emitted from the laser source 102 (FIG. 3) is scanning back and forth (between the solid and dotted lines shown in FIG. 10) to machine the first wall portion 222 along the first stage $ST_1$ of the first section $S_1$. Notably, the controller 112 (FIG. 3) has controlled the actuation assembly 110 to orient the component 200 in the first position P1. For this embodiment, the first position P1 is a position in which the component 200 is pitched upward about the transverse direction T by five degrees (5°) with respect to a zero degree (0°) reference line extending in a plane along the lateral and transverse directions L, T. Thus, in FIG. 10, the first pitch angle $\theta_1$ is an upward pitch of five degrees (5°).

By orienting the component 200 in the first position P1, the angle of attack of the laser beam 106 is adjusted. By adjusting the angle of attack of the laser beam 106, the first stage $ST_1$ of the first wall portion 222 situated within the first section $S_1$ is optimally positioned for lasering. That is, the component 200 is oriented such that the conically-shaped laser beam 106 does not clip areas that are not desired to be machined.

As shown in FIG. 11, for this embodiment, after the laser beam 106 machines the first wall portion 222 along the first stage $ST_1$ of the first section $S_1$, the laser beam 106 can penetrate deeper into the opening 210 to laser the first wall portion 222 along the second stage $ST_2$ of the first section $S_1$. As shown in FIG. 11, the controller 112 (FIG. 3) has controlled the actuation assembly 110 to maintain the orientation of the component 200 in the first position P1. To better machine the first wall portion 222 along the second stage $ST_2$ of the first section $S_1$, however, the controller 112 has controlled the actuation assembly to adjust the first pitch angle $\theta_1$. In particular, the controller 112 has controlled the actuation assembly 110 to increase the upward pitch of the component 200 about the transverse direction T from five degrees (5°) (FIG. 10) to ten degrees (10°) with respect to a zero degree (0°) reference line extending in a plane along the lateral and transverse directions L, T. Thus, in FIG. 11, the first pitch angle θ1 is an upward pitch often degrees (10°).

By adjusting the first pitch angle $\theta_1$ to laser the second stage $ST_2$ of the first wall portion 222, the angle of attack of the laser beam 106 is further adjusted, which in turn optimally positions the second stage $ST_2$ of the first wall portion 222 to be lasered. Moreover, in this way, the component 200 is oriented such that the conically-shaped laser beam 106 does not clip areas that are not desired to be machined as the laser beam 106 scans back and forth along the second stage $ST_2$ of the first wall portion 222.

After the laser beam 106 machines the first wall portion 222 along the first stage $ST_1$ and the second stage $ST_2$ of the first section $S_1$, although not depicted, the laser beam 106 can further penetrate deeper into the opening 210 to laser the first wall portion 222 along the third stage $ST_3$ of the first section $S_1$. In this way, the first wall portion 222 can be lasered along the entire depth D1 of the opening 210. The first pitch angle 61 can further be adjusted in the same manner as noted above such that laser beam 106 does not clip areas not desired to be machined (i.e., the component 200 can be pitched upward by another five (5°) about the transverse direction T such that the first pitch angle $\theta_1$ is fifteen degrees (15°)). Furthermore, in embodiments where the opening 210 includes a base wall 220, the base wall 220 within the first section $S_1$ can be lasered by the laser beam 106 while the component 200 is positioned in the first position P1. In such embodiments, the orientation of the component 200 can be adjusted such that the laser beam 106 does not clip areas not desired to be machined.

As shown in FIG. 12, after the laser beam 106 lasers the first wall portion 222 along the first, second, and third stages $ST_1$, $ST_2$, $ST_3$ and the base wall 220 within the first section $S_1$, the controller 112 (FIG. 3) can control the actuation assembly 110 to orient the component 200 in the second position P2 such that the second wall portion 224 is optimally positioned for lasering. For this embodiment, the second position P2 is a position in which the component 200 is pitched downward about the transverse direction T by five degrees (5°) with respect to a zero degree (0°) reference line extending in a plane along the lateral and transverse directions L, T. Thus, in FIG. 12, the second pitch angle $\theta_2$ is a downward pitch of five degrees (5°).

By orienting the component 200 in the second position P2, the angle of attack of the laser beam 106 is adjusted, and by adjusting the angle of attack of the laser beam 106, the first stage $ST_1$ along the second wall portion 224 is optimally positioned for being lasered. Namely, the component 200 is oriented such that the conically-shaped laser beam 106 does not clip areas that are not desired to be machined as the laser beam 106 scans back and forth (shown by the solid and dotted lines) along the first stage $ST_1$ of the second wall portion 224.

As shown in FIG. 13, for this embodiment, after the laser beam 106 lasers the second wall portion 224 along the first stage $ST_1$ of the second section $S_2$, the laser beam 106 can penetrate deeper into the opening 210 to laser the second wall portion 224 along the second stage $ST_2$ of the second section $S_2$. As shown in FIG. 13, the controller 112 (FIG. 3) has controlled the actuation assembly 110 to maintain the orientation of the component 200 in the second position P2. To better machine the second wall portion 224 along the second stage $ST_2$ of the second section $S_2$, however, the controller 112 has controlled the actuation assembly 110 to adjust the second pitch angle $\theta_2$. In particular, the controller 112 has controlled the actuation assembly 110 to increase the downward pitch of the component 200 about the transverse direction T from five degrees (5°) (FIG. 12) to ten degrees (10°) with respect to a zero degree (0°) reference line extending in a plane along the lateral and transverse directions L, T. Thus, in FIG. 13, the second pitch angle $\theta_2$ is a downward pitch of ten degrees (10°).

By adjusting the second pitch angle $\theta_2$ to laser the second stage $ST_2$ of the second wall portion 224, the angle of attack of the laser beam 106 is further adjusted, which in turn optimally positions the second stage $ST_2$ of the second wall portion 224 to be lasered. Moreover, in this way, the component 200 is oriented such that the conically-shaped laser beam 106 does not clip areas that are not desired to be machined as the laser beam 106 scans back and forth along the second stage $ST_2$ of the second wall portion 224.

After the laser beam 106 machines the second wall portion 224 along the first stage $ST_1$ and the second stage $ST_2$ of the second section $S_2$, although not depicted, the laser beam 106 can further penetrate deeper into the opening 210 to laser the second wall portion 224 along the third stage $ST_3$ of the second section $S_2$. In this way, the second wall portion 224 can be lasered along the entire depth $D_1$ of the opening 210. The second pitch angle $\theta_2$ can further be adjusted in the same manner as noted above such that laser beam 106 does not clip areas not desired to be machined (i.e., the component 200 can be pitched downward by another five (5°) about the transverse direction T such that the second pitch angle $\theta_2$ is fifteen degrees (15°)). Furthermore, in embodiments where the opening 210 includes a base wall 220, the base wall 220 within the second section $S_2$ can be lasered by the laser beam 106 while the component 200 is positioned in the second position P2. In such embodiments, the orientation of the component 200 can be adjusted such that the laser beam 106 does not clip areas not desired to be machined.

In alternative exemplary embodiments, the laser beam 106 can be controlled by the laser system 100 (FIG. 3) to alternate between lasering the first wall portion 222 and the second wall portion 224 to fully laser a particular stage before penetrating deeper into the opening 210 to laser the first and second wall portions 222, 224 of deeper stages of the opening 210. For instance, after lasering the first wall portion 222 along the first stage $ST_1$, the controller 112 can control the actuation assembly 110 to orient the component 200 in the second position P2. In the second position P2, the controller 112 can control the adjustable lens 104 (FIG. 3) to scan the laser beam 106 along the first stage $ST_1$ of the second wall portion 224. Thereafter, the controller 112 can control the actuation assembly 110 to orient (or reorient) the component 200 in the first position P1 such that the second stage $ST_2$ along the first wall portion 222 can be lasered. Next, the controller 112 can control the actuation assembly 110 to orient the component 200 in the second position P2 such that the second stage $ST_2$ along the second wall portion 224 can be lasered. The third stage $ST_3$ can be lasered in the same manner as the other stages.

In another exemplary aspect, a laser system is provided that is operatively configured to laser machine an opening into a component, such as e.g., a cooling hole into a CMC component of a gas turbine engine. For instance, the laser system 100 of FIG. 3 can be used to laser machine an opening into a component. Prior to machining an opening into a component, a controller of the laser system can receive a user input indicative of a predetermined geometry of the opening to be formed. Alternatively, the controller can determine the predetermined geometry of the opening automatically or as part of a planned machining schedule. The predetermined geometry can be, for example, a cylindrical through hole. The predetermined geometry of the opening can have a predetermined depth. For instance, the predetermined depth of a cooling hole can be the distance between the inner and outer surface of a wall of a CMC component.

Figure 14:
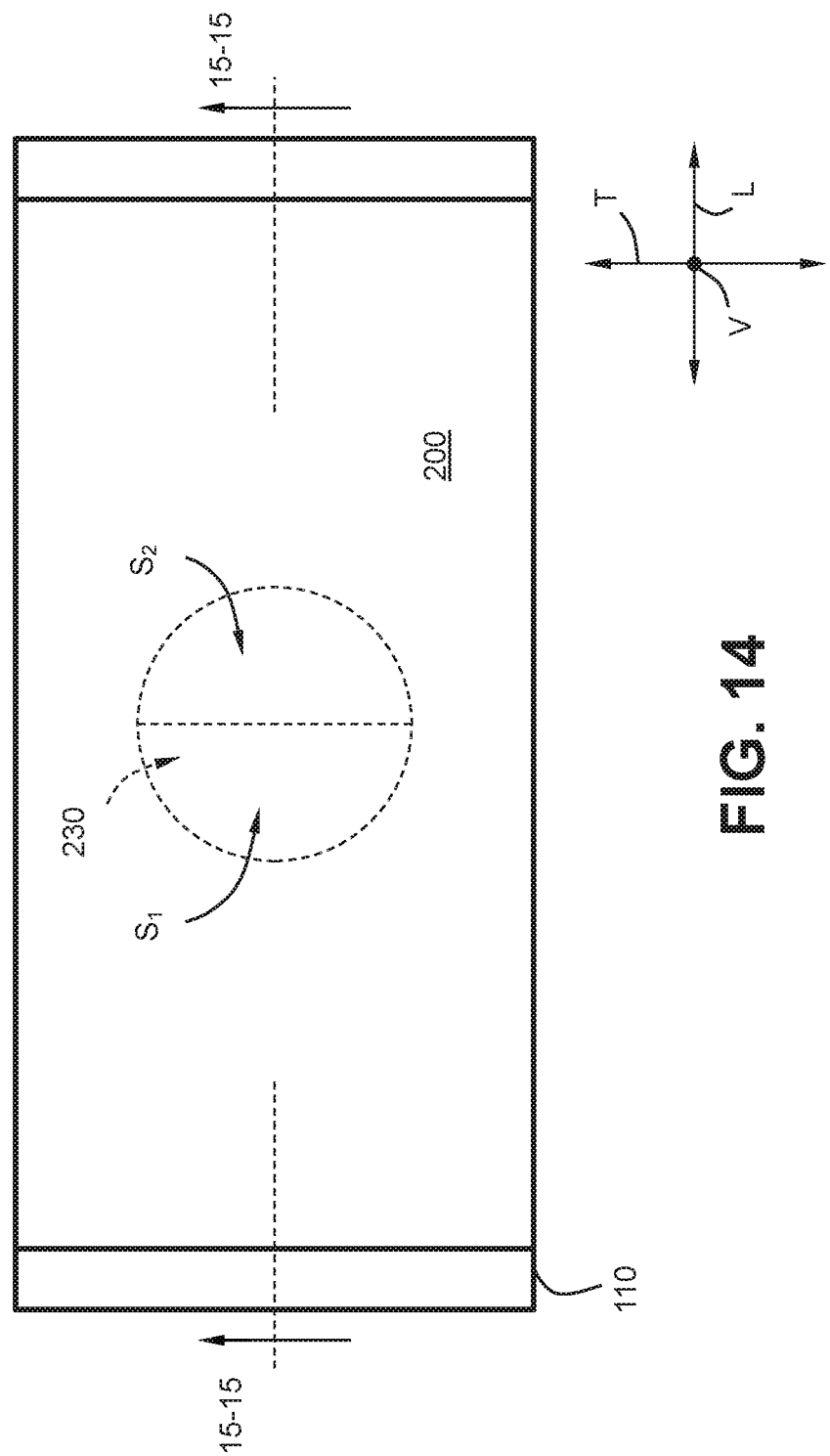
FIG. 14 provides a top view of an exemplary component and actuating assembly according to an exemplary embodiment of the present subject matter.

FIGS. 14 and 15 provide an example component into which a through hole is desired to be formed. Like numerals will be used to designate like or similar parts as noted above. FIG. 14 provides a top view of the exemplary component 200 and actuating assembly 110 and FIG. 15 provides a cross-sectional view of the component 200 and actuating assembly 110 taken along line 15-15 of FIG. 14 according to an exemplary embodiment of the present subject matter. For this embodiment, the component 200 is a CMC component shaped as a rectangular cuboid and the predetermined geometry 230 of the opening is a cylindrically-shaped through hole (i.e., a hole that extends through the component 200).

As shown in FIGS. 14 and 15, the component 200 defines vertical direction V, lateral direction L, and transverse direction T. Each of the vertical direction V, lateral direction L, and transverse direction T are mutually perpendicular to one another and form an orthogonal direction system. Thus, the component 200 defines the same coordinate system as the laser system 100 (FIG. 3). As further shown in FIGS. 14 and 15, the predetermined geometry 230 of the cylindrical through hole opening extends between a first end 212 and a second end 214 along the vertical direction V. The distance between the first end 212 and the second end 214 is denoted as the predetermined depth $D_2$ of the opening.

As shown particularly in FIG. 14, the predetermined geometry 230 of the opening defines first section $S_1$ and second section $S_2$ opposite the first section $S_1$. As shown in FIG. 15, the first section $S_1$ and the second section $S_2$ each extend along the predetermined depth $D_2$ of the predetermined geometry 230 of the opening. As further shown in FIG. 15, the predetermined geometry 230 of the opening defines a plurality of stages ST along its predetermined depth $D_2$. Each of the stages ST define a portion of the predetermined depth $D_2$ as shown in FIG. 15. More particularly, as shown, the predetermined geometry 230 of the opening defines a first stage $ST_1$ at or proximate the first end 212, a second stage $ST_2$ deeper in depth than the first stage $ST_1$, and a third stage $ST_3$ deeper in depth than the second stage $ST_2$. Although three stages (rows) are shown in this embodiment, it will be appreciated that the predetermined geometry 230 of the opening can define any suitable number of stages, such as e.g., ten (10) stages, one hundred (100) stages, one thousand (1,000) stages, etc. Moreover, although two sections (columns) are shown in this embodiment, it will be appreciated that the predetermined geometry of the opening can define any suitable number of sections, such as e.g., four (4) sections, six (6) sections, eight (8) sections, etc.

Figure 16:
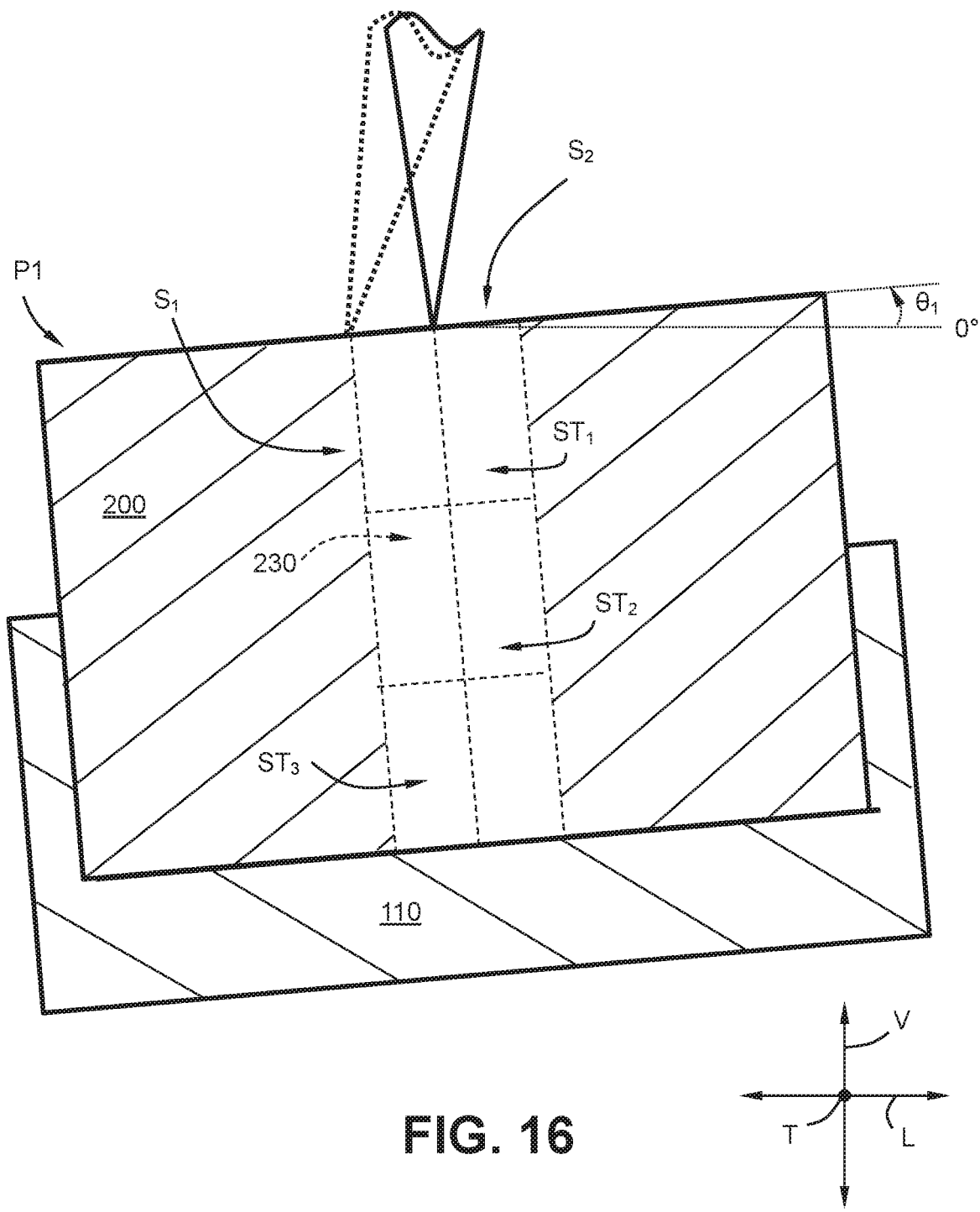
FIG. 16 provides a schematic view of the component of FIGS. 14 and 15 oriented in a first position and being machined by a laser beam at the first section and first stage of an opening of the component.
Figure 17:
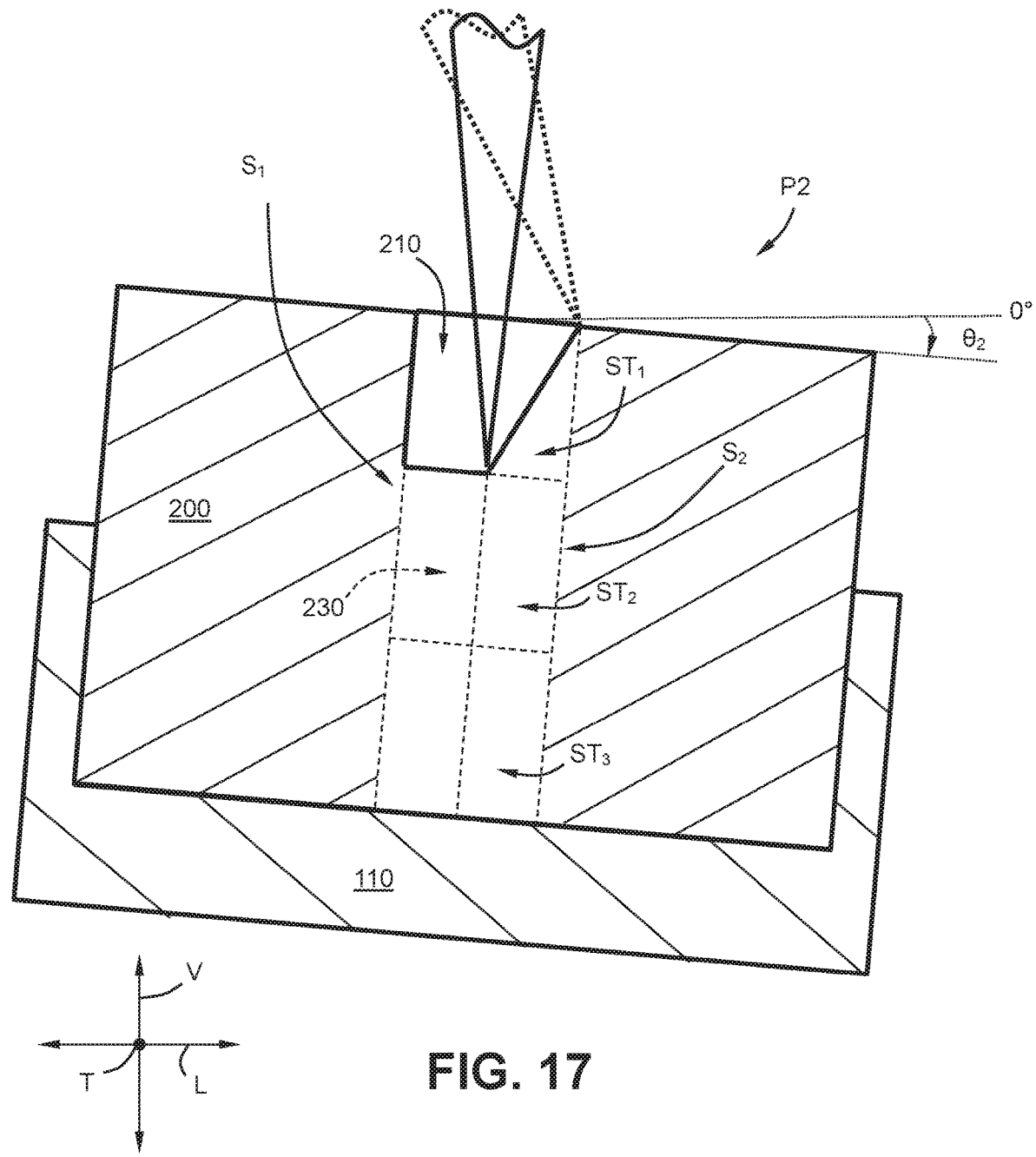
FIG. 17 provides a schematic view of the component of FIGS. 14 and 15 oriented in a second position and being machined by a laser beam at the second section and first stage of the opening of the component.
Figure 18:
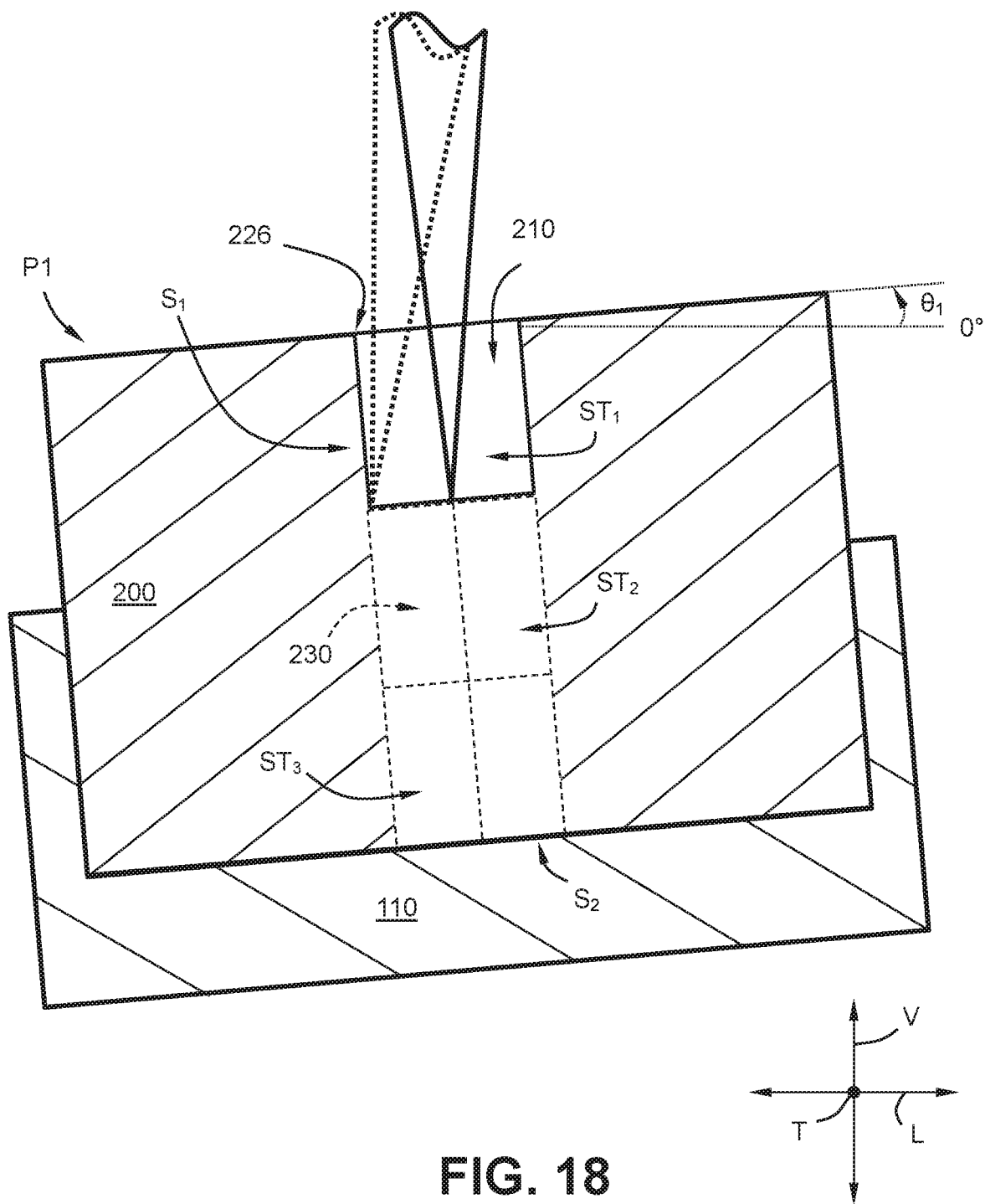
FIG. 18 provides a schematic view of the component of FIGS. 14 and 15 oriented in the first position and being machined by a laser beam at the first section and second stage of the opening of the component.
Figure 19:
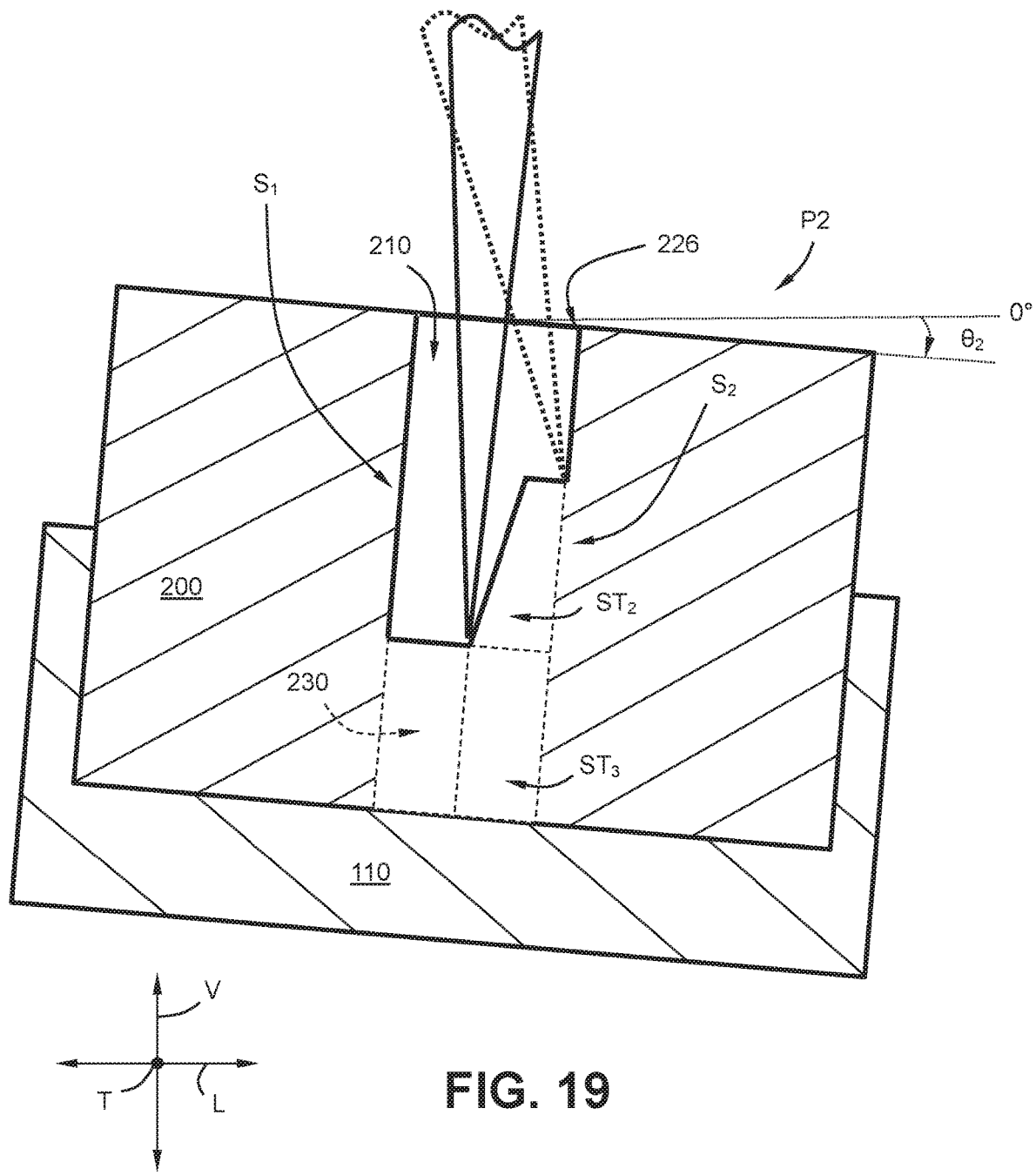
FIG. 19 provides a schematic view of the component of FIGS. 14 and 15 oriented in a second position and being machined by a laser beam at the second section and second stage of the opening of the component.

With reference now to FIGS. 16 through 19, an exemplary process for machining an opening into a component will be described. FIG. 16 provides a schematic view of the component 200 of FIGS. 14 and 15 oriented in a first position P1 and being machined by the conically-shaped laser beam 106 at the first stage $ST_1$; FIG. 17 provides another view of the component 200 thereof oriented in the second position P2 and being machined by the conically-shaped laser beam 106 at the first stage $ST_1$; FIG. 18 provides another view of the component 200 thereof oriented in the first position P1 and being machined by the conically-shaped laser beam 106 at the second stage $ST_2$; and FIG. 19 provides yet another view of the component 200 thereof oriented in the second position P2 and being machined by the conically-shaped laser beam 106 at the second stage $ST_2$.

As shown in FIG. 16, the laser beam 106 emitted from the laser source 102 (FIG. 3) is directed by the adjustable lens 104 (FIG. 3) to scan back and forth (between the solid and dotted laser beams 106 shown in FIG. 16) to laser the first stage $ST_1$ of the predetermined geometry 230 primarily within the first section $S_1$. In this way, the laser beam 106 can remove material so as to form the opening. Notably, the controller 112 (FIG. 3) has controlled the actuation assembly 110 to orient the component 200 in the first position P1. For this embodiment, the first position P1 is a position in which the component 200 is pitched upward about the transverse direction T by five degrees (5°) with respect to a zero degree (0°) reference line extending in a plane along the lateral and transverse directions L, T. Thus, in FIG. 16, the first pitch angle $\theta_1$ is an upward pitch of five degrees (5°).

By orienting the component 200 in the first position P1, the angle of attack of the laser beam 106 is adjusted. By adjusting the angle of attack of the laser beam 106, the first stage $ST_1$ of the first section $S_1$ is optimally positioned for being lasered. Stated differently, the component 200 is oriented such that the conically-shaped laser beam 106 does not clip areas that are not desired to be machined as the laser beam 106 scans back and forth.

As shown in FIG. 17, a part of the opening 210 has been formed in the component 200 as a portion of material of the first stage $ST_1$ has been removed. More specifically, a portion of material of the first stage $ST_1$ was removed while the component 200 was oriented in the first position P1 as shown in FIG. 16. For this embodiment, after lasering the first stage $ST_1$ with the component 200 in the first position P1, the controller 112 (FIG. 3) controls the actuation assembly 110 to orient the component 200 in the second position P2 such that the first stage $ST_1$ of the second section $S_2$ is optimally positioned for lasering. FIG. 17 depicts the component 200 oriented in the second position P2. For this embodiment, the second position P2 is a position in which the component 200 is pitched downward about the transverse direction T by five degrees (5°) with respect to a zero degree (0°) reference line extending in a plane along the lateral and transverse directions L, T. Thus, in FIG. 17, the second pitch angle $\theta_2$ is a downward pitch of five degrees (5°).

By orienting the component 200 in the second position P2, the angle of attack of the laser beam 106 is adjusted. By adjusting the angle of attack of the laser beam 106, the first stage $ST_1$ of the second section $S_2$ is optimally positioned for lasering. Moreover, when the component 200 is oriented in the second position P2 for lasering the first stage $ST_1$ of the second section $S_2$, the component 200 is oriented such that the conically-shaped laser beam 106 does not clip areas that are not desired to be machined as the laser beam 106 scans back and forth (i.e., between the solid and dotted laser beam 106 lines).

As shown in FIG. 18, the material of the first stage $ST_1$ has been completely removed and now the laser system 100 (FIG. 3) will laser the remaining stages of the predetermined geometry 230. For this embodiment, after finishing lasering the first stage $ST_1$ while the component 200 was oriented in the second position P2 (FIG. 17), the controller 112 (FIG. 3) controls the actuation assembly 110 to orient or reorient the component 200 in the first position P1. FIG. 18 depicts the component 200 oriented or reoriented in the first position P1. While oriented in the first position P1, the component 200 can be oriented at the same pitch angle as was used to machine the first stage $ST_1$ in the first position P1 (FIG. 16), or alternatively, the first pitch angle $\theta_1$ can be adjusted so as to make the second stage $ST_2$ of the predetermined geometry 230 more accessible to the laser beam 106. Stated alternatively, the first pitch angle $\theta_1$ can be adjusted such that when the laser beam 106 lasers the second stage $ST_2$, the laser beam 106 does not clip parts or areas of the component 200 that are not desired to be machined, such as e.g., the edge 226 of the opening 210.

For this embodiment, the first pitch angle $\theta_1$ has remained the same as it was for lasering the first stage $ST_1$ within primarily the first section $S_1$. Thus, for this embodiment, the first position P1 is a position in which the component 200 is pitched upward about the transverse direction T by five degrees (5°) with respect to a zero degree (0°) reference line extending in a plane along the lateral and transverse directions L, T. Accordingly, in FIG. 18, the first pitch angle $\theta_1$ is an upward pitch of five degrees (5°).

By orienting the component 200 in the first position P1 when lasering the second stage $ST_2$ primarily within the first section $S_1$, the angle of attack of the laser beam 106 is adjusted. By adjusting the angle of attack of the laser beam 106, the second stage $ST_2$ of the first section $S_1$ is optimally positioned for lasering. Stated differently, the component is oriented such that the conically-shaped laser beam 106 does not clip areas that are not desired to be machined as the laser beam 106 scans back and forth (i.e., between the solid and dotted lines of the laser beam 106 shown in FIG. 18).

As shown in FIG. 19, the opening 210 has been further formed into the component 200 as a portion of material of the second stage $ST_2$ has been removed. More specifically, a portion of material of the second stage $ST_2$ was removed while the component 200 was oriented in the first position P1 (FIG. 18). For this embodiment, after lasering the second stage $ST_2$ while the component was oriented in the first position P1, the controller 112 (FIG. 3) controls the actuation assembly 110 to orient or reorient the component 200 in the second position P2. FIG. 19 depicts the component 200 oriented or reoriented in the second position P2. While oriented in the second position P2, the component 200 can be oriented at the same pitch angle as was used to machine the first stage $ST_1$ in the second position P2 (FIG. 17), or alternatively, the second pitch angle $\theta_2$ can be adjusted so as to make the second stage $ST_2$ within the second section $S_2$ of the predetermined geometry 230 more accessible to the laser beam 106. Stated alternatively, the second pitch angle $\theta_2$ can be adjusted such that when the laser beam 106 lasers the second stage $ST_2$ within the second section $S_2$, the laser beam 106 does not clip parts or areas of the component 200 that are not desired to be machined, such as e.g., the edge 226 of the opening 210.

For this embodiment, the second pitch angle $\theta_2$ has remained the same as it was for lasering the first stage $ST_1$ within primarily the second section $S_2$. Thus, for this embodiment, the second position P2 is a position in which the component 200 is pitched downward about the transverse direction T by five degrees (5°) with respect to a zero degree (0°) reference line extending in a plane along the lateral and transverse directions L, T. Accordingly, in FIG. 19, the second pitch angle $\theta_2$ is a downward pitch of five degrees (5°).

By orienting the component 200 in the second position P2 when lasering the second stage $ST_2$ primarily within the second section $S_2$, the angle of attack of the laser beam 106 is adjusted. By adjusting the angle of attack of the laser beam 106, the second stage $ST_2$ of the second section $S_2$ is optimally positioned for lasering. Stated differently, the component 200 is oriented such that the conically-shaped laser beam 106 does not clip areas that are not desired to be machined as the laser beam 106 scans back and forth (i.e., between the solid and dotted lines of the laser beam 106 shown in FIG. 19).

After the laser beam 106 machines the first stage $ST_1$ and the second stage $ST_2$, although not depicted, the laser beam 106 can further penetrate deeper into the opening 210 to laser the third stage $ST_3$ using the same alternating pattern as described above. In this way, the predetermined geometry 230 can be lasered along its entire predetermined depth $D_2$ such that the opening 210 can be completely formed, which in this embodiment is a through hole extending through the component 200. The first pitch angle $\theta_1$ (when the component 200 is oriented in the first position P1) and the second pitch angle $\theta_2$ (when the component 200 is oriented in the second position P2) can further be adjusted in the same manner as noted above when lasering the third stage $ST_3$ such that laser beam 106 does not clip areas not desired to be machined as the laser beam 106 penetrates deeper into the opening 210.

Alternatively or in addition to orienting the component in the first or second positions, to optimally position one or more stages or portions of the predetermined geometry of the opening, the component can be oriented in a third position or a fourth position as well. The component can be alternated between the third and fourth positions in the same manner as noted above for the first and second positions. When the component is oriented in the third position (e.g., as shown in FIG. 6), the component can be pitched upward about the lateral direction with respect to a zero degree (0°) reference line. When the component is oriented in the fourth position (e.g., as shown in FIG. 7), the component can be pitched downward about the lateral direction with respect to a zero degree (0°) reference line. In some embodiments, for example, the component can be oriented in the first position to laser a portion of the predetermined geometry of the opening. Then, the component can be oriented in the second position to laser a portion of the predetermined geometry. Thereafter, the component can be oriented in the third position to laser another portion of the predetermined geometry. Last, the component can be oriented to in the fourth position to laser yet another portion of the predetermined geometry. The component can be alternated between positions until the opening is fully formed. It will be appreciated that the pitch angle for each of the positions can remain the same or can be adjusted to better position a particular portion of the predetermined geometry for machining. Moreover, it will be appreciated that the component can be moved about between the positions in any suitable order. It will further be appreciated that the actuating assembly can also translate the component in addition to rotating or pitching the component to one or more positions. It will yet further be appreciated that the component can be pitched or translated to any suitable number of positions and that the present disclosure is not limited to the number of positions described herein for example purposes.

Figure 20:
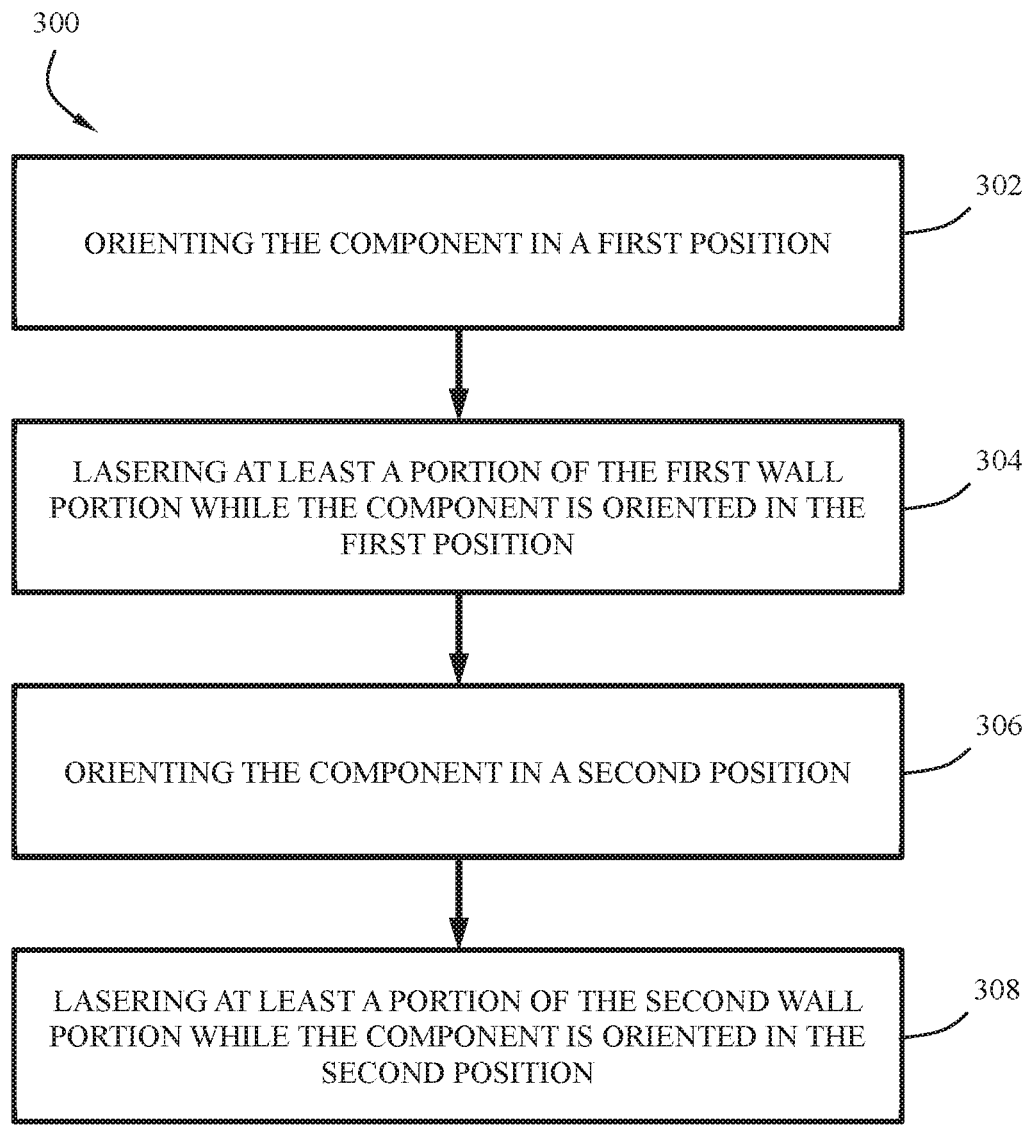
FIG. 20 provides a flow diagram of an exemplary method according to an exemplary embodiment of the present disclosure.

FIG. 20 provides a flow diagram of an exemplary method according to an exemplary embodiment of the present disclosure. In particular, FIG. 20 provides a flow diagram for a method for laser machining one or more walls of an opening of a component using a conically-shaped laser beam 106. The one or more walls defining a first wall portion and a second wall portion. Some or all of the method (300) can be implemented by the laser system 100 illustrated and described herein, for example.

At (302), the method (300) includes orienting the component in a first position. For instance, the component can be the component 200 described herein. The component can be, for example, a CMC component (e.g., the turbine nozzle segment 80 of FIG. 2) for a gas turbine engine (e.g., the turbofan engine 10 of FIG. 1). The opening can be, for example, one of the cooling holes 88 of the turbine nozzle segment 80 of FIG. 2. In some implementations, the component defines a vertical direction, a lateral direction, and a transverse direction each perpendicular to one another. In such implementations, when the component is oriented in the first position, the component has a first pitch angle indicative of an upward pitch about at least one of the lateral and transverse directions with respect to a reference plane defined by the lateral and transverse directions. For example, the component in FIG. 10 is oriented in the first position.

At (304), the method (300) includes lasering at least a portion of the first wall portion while the component is oriented in the first position. For instance, the laser beam 106 emitted from the laser source 102 and directed by the adjustable lens 104 of FIG. 3 can be used to laser the first wall portion. The first wall portion can be, for example, the first wall portion 222 as shown in FIG. 9. FIGS. 10 and 11 depict the first wall portion 222 being lasered by the laser beam 106. Notably, the component is oriented in the first position while the first wall portion 222 is lasered. By orienting the component in the first position, the first wall portion 222 is optimally positioned for lasering. Moreover, the orientation of the component 200 adjusts the angle of attack of the laser such that the conically-shaped laser beam 106 will not clip areas outside of the predetermined geometry of the opening 210.

At (306), the method (300) includes orienting the component in a second position. In some implementations, when the component is oriented in the second position, the component has a second pitch angle indicative of a downward pitch about at least one of the lateral and transverse directions with respect to the reference plane defined by the lateral and transverse directions. For example, the component depicted in FIGS. 12 and 13 is oriented in the second position.

At (308), the method (300) includes lasering at least a portion of the second wall portion while the component is oriented in the second position. For instance, the laser beam 106 emitted from the laser source 102 and directed by the adjustable lens 104 of FIG. 3 can be used to laser the second wall portion. The second wall portion can be, for example, the second wall portion 224 shown in FIG. 9. FIGS. 12 and 13 depict the second wall portion 224 being lasered by the laser beam 106. Notably, the component is oriented in the second position while the second wall portion 224 is lasered. By orienting the component in the second position, the second wall portion 224 is optimally positioned for lasering. Moreover, the orientation of the component 200 adjusts the angle of attack of the laser such that the conically-shaped laser beam 106 will not clip areas outside of the predetermined geometry of the opening 210. In some implementations, the first wall portion is parallel to the second wall portion. In some implementations, the first wall portion is substantially parallel to the second wall portion.

In yet other implementations, the second pitch angle is opposite the first pitch angle. For example, if the first pitch angle is an upward pitch of three degrees (3°) with respect to a reference plane (e.g., a 0° reference plane extending along the lateral and transverse directions as shown in FIGS. 4 through 7), then the second pitch angle is a downward pitch of three degrees (3°).

In some implementations, the opening has a depth. In such implementations, the opening defines a plurality of stages each defining a portion of the depth, the plurality of stages including a first stage, e.g., the first stage ST$_1$ shown in FIG. 9. In such implementations, when the component is oriented in the first position, the first wall portion is lasered along the first stage of the opening, and when the component is oriented in the second position, the second wall portion is lasered along the first stage of the opening.

In yet other implementations, the plurality of stages includes a second stage deeper in depth than the first stage (e.g., the second stage ST$_2$ shown in FIG. 9), and after orienting the component in the first position and lasering the first wall portion along the first stage of the opening and orienting the component in the second position and lasering the second wall portion along the first stage of the opening, the method (300) includes: orienting the component in the first position; lasering the first wall portion along the first wall portion along the second stage of the opening while the component is oriented in the first position; orienting the component in the second position; and lasering the second wall portion along the second wall portion along the second stage of the opening while the component is oriented in the second position.

In some implementations, the opening has a depth and wherein the opening defines a plurality of stages each defining a portion of the depth, and wherein the method further comprises: alternating between orienting and lasering the first wall portion while in the first position and orienting and lasering the second wall portion while in the second position until each stage is lasered along the depth of the opening.

In yet other implementations, the opening defines a predetermined geometry indicative of a desired shape of the opening, and wherein when the component is alternated between the first and second positions and lasered, the component is oriented such that the laser beam does not clip an area outside of the predetermined geometry of the opening.

In yet further implementations, the component defines a vertical direction, a lateral direction, and a transverse direction each perpendicular to one another, and wherein when the component is oriented in the first position, the component has a first pitch angle indicative of an upward pitch about at least one of the lateral and transverse directions with respect to a reference plane defined by the lateral and transverse directions, and wherein when the component is oriented in the second position, the component has a second pitch angle indicative of a downward pitch about at least one of the lateral and transverse directions with respect to the reference plane defined by the lateral and transverse directions, and wherein as the laser beam lasers progressively deeper stages of the opening, the upward pitch of the first pitch angle is increased and the downward pitch of the second pitch angle is increased. In this way, the angle of attack of the laser beam is adjusted or changes by depth. Stated differently, as the laser beam penetrates deeper into the depth of the opening, the angle of attack of the laser beam can be adjusted (i.e., by rotating or pitching the component about one or more of the lateral and transverse directions). The upward pitch of the first pitch angle can be increased incrementally, or in some embodiments, the upward pitch of the first pitch angle can be increased gradually. Likewise, the downward pitch of the second pitch angle can be increased incrementally, or in some embodiments, the upward pitch of the first pitch angle can be increased gradually.

In some implementations, the one or more walls define a third wall portion and a fourth wall portion. In such implementations, the method further includes: orienting the component in a third position; lasering at least a portion of the third wall portion while the component is oriented in the third position; orienting the component in a fourth position; and lasering at least a portion of the fourth wall portion while the component is oriented in the fourth position.

In yet further implementations, the component defines a vertical direction, a lateral direction, and a transverse direction each perpendicular to one another, and wherein when the component is oriented in the first position, the component has a first pitch angle indicative of an upward pitch about the transverse direction with respect to a reference plane defined by the lateral and transverse directions, and wherein when the component is oriented in the second position, the component has a second pitch angle indicative of a downward pitch about the transverse direction with respect to the reference plane defined by the lateral and transverse directions, and wherein when the component is oriented in the third position, the component has a third pitch angle indicative of an upward pitch about the lateral direction with respect to a reference plane defined by the lateral and transverse directions, and wherein when the component is oriented in the fourth position, the component has a fourth pitch angle indicative of a downward pitch about the lateral direction with respect to the reference plane defined by the lateral and transverse directions.

Figure 21:
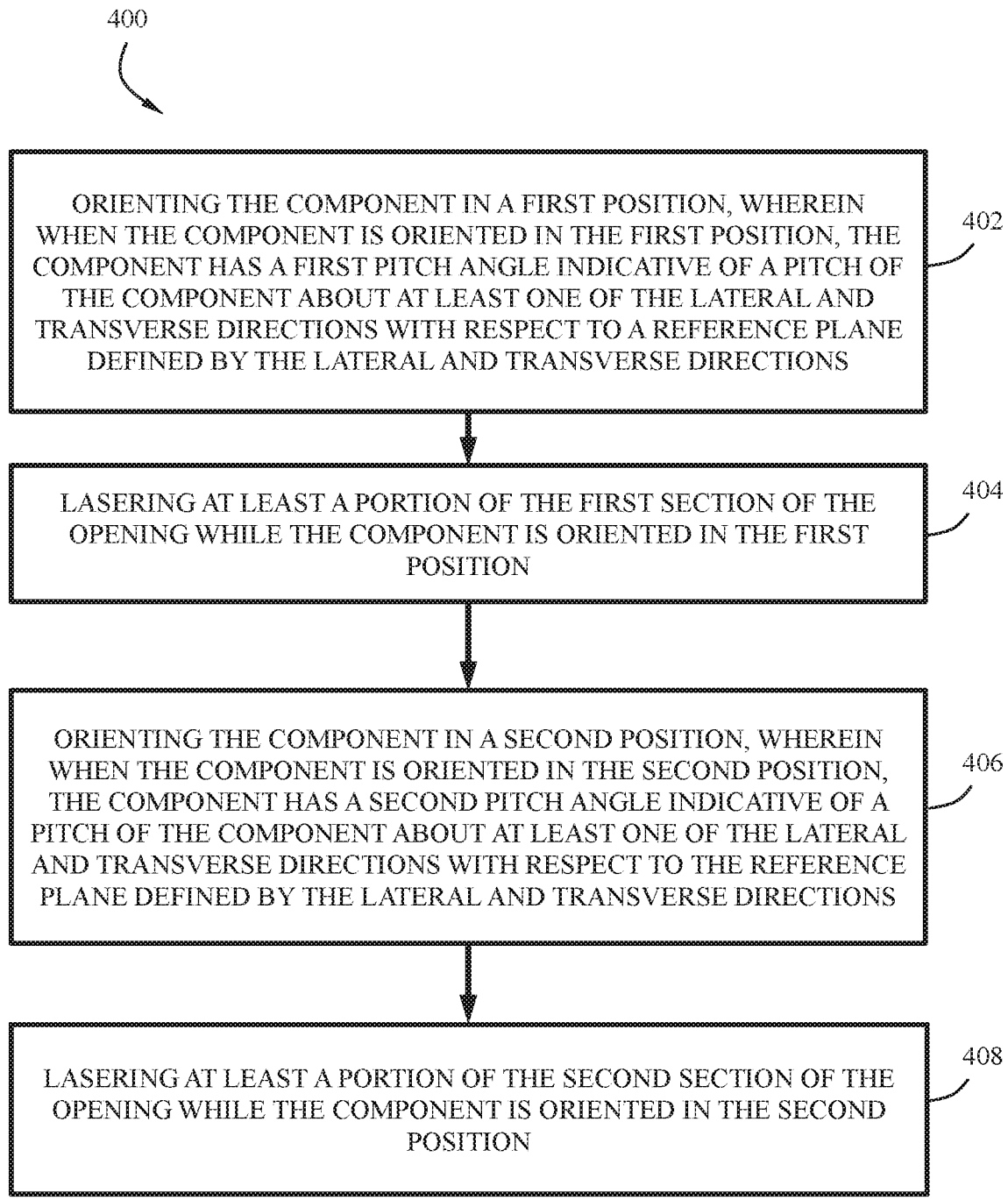
FIG. 21 provides a flow diagram of another exemplary method according to an exemplary embodiment of the present disclosure.

FIG. 21 provides a flow diagram of an exemplary method according to an exemplary embodiment of the present disclosure. In particular, FIG. 21 provides a flow diagram for a method for laser machining an opening into a component using a conically-shaped laser beam, the opening defining a first section and a second section opposite the first section. Some or all of the method (400) can be implemented by the laser system 100 illustrated and described herein, for example.

At (402), the method (400) includes orienting the component in a first position, wherein when the component is oriented in the first position, the component has a first pitch angle indicative of a pitch of the component about at least one of the lateral and transverse directions with respect to a reference plane defined by the lateral and transverse directions. For instance, the component can be the component 200 described herein. The component can be, for example, a CMC component (e.g., the turbine nozzle segment 80 of FIG. 2) for a gas turbine engine (e.g., the turbofan engine 10 of FIG. 1). The opening can be, for example, one of the cooling holes 88 of the turbine nozzle segment 80 of FIG. 2. As an example, the component depicted in FIGS. 10 and 11 is oriented in the first position.

At (404), the method (400) includes lasering at least a portion of the first section of the opening while the component is oriented in the first position. In this way, at least a portion of the opening can be formed or otherwise machined.

At (406), the method (400) includes orienting the component in a second position, wherein when the component is oriented in the second position, the component has a second pitch angle indicative of a pitch of the component about at least one of the lateral and transverse directions with respect to the reference plane defined by the lateral and transverse directions. For example, the component depicted in FIGS. 12 and 13 is oriented in the second position.

At (408), the method (400) includes lasering at least a portion of the second section of the opening while the component is oriented in the second position. In this way, at least a portion of the opening can be formed or otherwise machined.

In some implementations, when the component is oriented in the first position, the component has a first pitch angle indicative of an upward pitch about at least one of the lateral and transverse directions with respect to the reference plane defined by the lateral and transverse directions, and wherein when the component is oriented in the second position, the component has a second pitch angle indicative of a downward pitch about at least one of the lateral and transverse directions with respect to the reference plane defined by the lateral and transverse directions.

In yet other implementations, the opening defines a depth, and wherein as the laser beam lasers progressively deeper into the depth of the opening, the component is alternated between the first position and the second position such that the first and second sections of the opening can be lasered respectively, and wherein as the laser beam lasers progressively deeper into the depth of the opening, the upward pitch of the first pitch angle is increased when the component is oriented in the first position and the downward pitch of the second pitch angle is increased when the component is oriented in the second position.

In some implementations, the opening defines a predetermined geometry indicative of a desired shape of the opening. In such implementations, the opening has a depth and wherein the opening defines a plurality of stages each defining a portion of the depth. Moreover, in such implementations, the method further includes alternating between orienting the component in the first position such that at least a portion of the first section of each stage is lasered and orienting the component in the second position such that at least a portion of the second section of each stage is lasered prior to progressing to deeper stage of the opening; and repeating alternating until the predetermined geometry of the opening is formed to the desired shape, wherein the component is alternated between the first and second positions and lasered such that the laser beam does not clip the component in an area outside of the predetermined geometry of the opening.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for laser machining one or more walls of an opening of a component using a conically-shaped laser beam, one of the one or more walls extending between a first end and a second end and defining a first wall portion and a second wall portion, the method comprising:
    orienting the component in a first position;
    lasering, with the conically-shaped laser beam, at least a portion of the first wall portion while the component is oriented in the first position;
    orienting the component in a second position; and
    lasering, with the conically-shaped laser beam, at least a portion of the second wall portion while the component is oriented in the second position;
    wherein the component defines a vertical direction, a lateral direction, and a transverse direction each perpendicular to one another;
    wherein when the component is oriented in the first position, the component has a first pitch angle indicative of an upward pitch about at least one of the lateral and transverse directions with respect to a reference plane defined by the lateral and transverse directions, when the component is oriented in the second position, the component has a second pitch angle indicative of a downward pitch about at least one of the lateral and transverse directions with respect to the reference plane defined by the lateral and transverse directions; and
    wherein the opening has a depth and the opening defines a plurality of stages, wherein as the conically-shaped laser beam lasers progressively deeper stages of the opening, the upward pitch of the first pitch angle is increased and the downward pitch of the second pitch angle is increased.

2. The method of claim 1, wherein the first wall portion is substantially parallel to the second wall portion and a distance between the first wall portion and the second wall portion is substantially equal throughout the depth of the opening.

3. The method of claim 1, wherein the plurality of stages each define a portion of the depth, the plurality of stages including a first stage, and wherein when the component is oriented in the first position, the first wall portion is lasered along the first stage of the opening, and wherein when the component is oriented in the second position, the second wall portion is lasered along the first stage of the opening.

4. The method of claim 3, wherein the plurality of stages includes a second stage deeper in depth than the first stage, and wherein after orienting the component in the first position and lasering the first wall portion along the first stage of the opening and orienting the component in the second position and lasering the second wall portion along the first stage of the opening, the method further comprises:
    orienting the component in the first position;
    lasering the first wall portion along the first wall portion along the second stage of the opening while the component is oriented in the first position;
    orienting the component in the second position; and
    lasering the second wall portion along the second wall portion along the second stage of the opening while the component is oriented in the second position.

5. The method of claim 2, wherein the plurality of stages each define a portion of the depth, and wherein the method further comprises:
    alternating between orienting and lasering the first wall portion while in the first position and orienting and lasering the second wall portion while in the second position until each stage is lasered along the depth of the opening.

6. The method of claim 1, wherein the one or more walls define a third wall portion and a fourth wall portion, the method further comprises:
    orienting the component in a third position;
    lasering at least a portion of the third wall portion while the component is oriented in the third position;
    orienting the component in a fourth position; and
    lasering at least a portion of the fourth wall portion while the component is oriented in the fourth position.

7. The method of claim 6, wherein the component defines a vertical direction, a lateral direction, and a transverse direction each perpendicular to one another, and wherein when the component is oriented in the first position, the component has a first pitch angle indicative of an upward pitch about the transverse direction with respect to a reference plane defined by the lateral and transverse directions, and wherein when the component is oriented in the second position, the component has a second pitch angle indicative of a downward pitch about the transverse direction with respect to the reference plane defined by the lateral and transverse directions, and wherein when the component is oriented in the third position, the component has a third pitch angle indicative of an upward pitch about the lateral direction with respect to the reference plane defined by the lateral and transverse directions, and wherein when the component is oriented in the fourth position, the component has a fourth pitch angle indicative of a downward pitch about the lateral direction with respect to the reference plane defined by the lateral and transverse directions.

8. The method of claim 1, wherein the component is a Ceramic Matrix Composite (CMC) component for a gas turbine engine and the opening is a cooling hole.

9. The method of claim 8, wherein the cooling hole has a diameter between about 0.015 inches and about 0.060 inches.

10. The method of claim 1, wherein the opening has a length over diameter ratio between about 1:1 to about a 10:1.

11. A laser system for machining an opening into a component, the laser system defining a vertical direction, a lateral direction, and a transverse direction each perpendicular to one another, the component defining a first section and a second section, the laser system comprising:
  a laser source configured to machine the opening to a predetermined geometry with a conically-shaped laser beam;
  an adjustable lens configured to focus the conically-shaped laser beam;
  an actuation assembly for orienting the component;
  a controller communicatively coupled with the laser source, the adjustable lens, and the actuation assembly, the controller configured to:
  control the actuating assembly to orient the component in a first position, wherein when the component is oriented in the first position, the component has a first pitch angle indicative of an upward pitch of the component about at least one of the lateral and transverse directions with respect to a reference plane defined by the lateral and transverse directions;
  control the laser source and the adjustable lens to laser the first section of the component while the component is oriented in the first position;
  control the actuating assembly to orient the component in a second position, wherein when the component is oriented in the second position, the component has a second pitch angle indicative of a downward pitch of the component about at least one of the lateral and transverse directions with respect to a reference plane defined by the lateral and transverse directions;
  control the laser source and the adjustable lens to laser the second section of the component while the component is oriented in the second position; and
  control the laser source and the adjustable lens to increase the upward pitch of the first pitch angle and increase the downward pitch of the second pitch angle as the conically-shaped laser beam lasers progressively deeper stages of the opening such that the conically-shaped laser beam does not clip areas outside of the predetermined geometry of the opening.

12. A method for laser machining an opening into a component using a conically-shaped laser beam, the opening having a depth that extends from a first end to a second end, the opening defining a first section and a second section opposite the first section, the method comprising:
  orienting the component in a first position, wherein when the component is oriented in the first position, the component has a first pitch angle indicative of a pitch of the component about at least one of the lateral and transverse directions with respect to a reference plane defined by the lateral and transverse directions;
  lasering, with the conically-shaped laser beam, at least a portion of the first section of the opening while the component is oriented in the first position;
  orienting the component in a second position, wherein when the component is oriented in the second position, the component has a second pitch angle indicative of a pitch of the component about at least one of the lateral and transverse directions with respect to the reference plane defined by the lateral and transverse directions; and
  lasering, with the conically-shaped laser beam, at least a portion of the second section of the opening while the component is oriented in the second position;
  wherein when the component is oriented in the first position, the component has a first pitch angle indicative of an upward pitch about at least one of the lateral and transverse directions with respect to the reference plane defined by the lateral and transverse directions, and wherein when the component is oriented in the second position, the component has a second pitch angle indicative of a downward pitch about at least one of the lateral and transverse directions with respect to the reference plane defined by the lateral and transverse directions;
  wherein as the conically-shaped laser beam lasers progressively deeper into the depth of the opening, the component is alternated between the first position and the second position such that the first and second sections of the opening can be lasered respectively, and wherein as the conically-shaped laser beam lasers progressively deeper into the depth of the opening, the upward pitch of the first pitch angle is increased when the component is oriented in the first position and the downward pitch of the second pitch angle is increased when the component is oriented in the second position.

13. The method of claim 12, wherein the opening defines a predetermined geometry indicative of a desired shape of the opening, and wherein the opening defines a plurality of stages each defining a portion of the depth, and wherein the method further comprises:
  alternating between orienting the component in the first position such that at least a portion of the first section of each stage is lasered and orienting the component in the second position such that at least a portion of the second section of each stage is lasered prior to progressing to deeper stage of the opening; and
  repeating alternating until the predetermined geometry of the opening is formed to the desired shape, wherein the component is alternated between the first and second positions and lasered such that the conically-shaped laser beam does not clip the component in an area outside of the predetermined geometry of the opening.

14. The method of claim 1, wherein the first pitch angle is an upward pitch of ten degrees and the second pitch angle is a downward pitch of ten degrees.

15. The method of claim 1, wherein as the conically-shaped laser beam lasers progressively deeper stages of the opening, the upward pitch of the first pitch angle is increased by five degrees and the downward pitch of the second pitch angle is increased by five degrees.

16. The method of claim 1, wherein there are at least three stages that the conically-shaped laser beam lasers.

17. The method of claim 16, wherein when the conically-shaped laser beam is lasering the third stage of the opening, the upward pitch of the first pitch angle is at least fifteen degrees and the downward pitch of the second angle is at least fifteen degrees.

18. The method of claim 17, wherein the opening is generally cylindrical.

19. The method of claim 5, wherein the plurality of stages includes a first stage and a second stage;
- wherein when the component is oriented in the first position and the conically-shaped laser beam lasers the first stage of the opening, the conically-shaped laser scans back and forth in the vertical direction along the first stage of the first wall portion;
- wherein when the component is oriented in the second position and the conically-shaped laser beam lasers the first stage of the opening, the conically-shaped laser scans back and forth in the vertical direction along the first stage of the second wall portion;
- wherein when the component is oriented in the second position and the conically-shaped laser beam lasers the second stage of the opening, the conically-shaped laser scans back and forth in the vertical direction along the second stage of the second wall portion; and
- wherein when the component is oriented in the first position and the conically-shaped laser beam lasers the second stage of the opening, the conically-shaped laser scans back and forth in the vertical direction along the second stage of the first wall portion.

* * * * *